US012434399B2

(12) United States Patent
Bridges et al.

(10) Patent No.: US 12,434,399 B2
(45) Date of Patent: Oct. 7, 2025

(54) RAZOR ASSEMBLY WITH LOOP SHAPED SPRING MEMBER

(71) Applicant: The Gillette Company LLC, Boston, MA (US)

(72) Inventors: Kelly Daniel Bridges, Randolph, MA (US); Steven Michael Bourque, Billerica, MA (US); Marco Fontecchio, Framingham, MA (US); Aiqin Li, Foxboro, MA (US); Matthew Frank Murgida, Somerville, MA (US); Jessy Lee Cusack, Attleboro, MA (US)

(73) Assignee: The Gillette Company LLC, Boston, MA (US)

( * ) Notice: Subject to any disclaimer, the term of this patent is extended or adjusted under 35 U.S.C. 154(b) by 0 days.

(21) Appl. No.: 16/368,427

(22) Filed: Mar. 28, 2019

(65) Prior Publication Data

US 2019/0366573 A1 Dec. 5, 2019

Related U.S. Application Data

(60) Provisional application No. 62/650,286, filed on Mar. 30, 2018.

(51) Int. Cl.
*B26B 21/40* (2006.01)

(52) U.S. Cl.
CPC ................................ *B26B 21/4075* (2013.01)

(58) Field of Classification Search
CPC ............ B26B 21/4075; B26B 21/4062; B26B 21/225; B26B 21/521
See application file for complete search history.

(56) References Cited

U.S. PATENT DOCUMENTS 2,302,941 A * 11/1942 John ........................ B26B 19/38 30/43.92
2,549,542 A 4/1951 Stair
(Continued)

FOREIGN PATENT DOCUMENTS

DE 177731 C 8/1905
DE 471589 C 2/1929
(Continued)

OTHER PUBLICATIONS

Smalley, Monotour, Sep. 15, 2014, https://www.youtube.com/watch?v=ZSfjUpy4MO0 (Year: 2014).*
(Continued)

*Primary Examiner* — Evan H MacFarlane
*Assistant Examiner* — Fernando A Ayala

(57) ABSTRACT

The present invention describes a novel spring mechanism for a razor. In the razor, the spring member may be disposed in a movable member assembly, portions of which may be used for ejection or pivoting. The spring may be fully encompassed within the assembly and be placed within supporting structures therein. The spring is a loop-shaped element having overlapping end portions with free distal ends. Alternately, the spring member is tear drop shaped loop shape with distal ends that are spaced apart. The spring may be disposed within a first and/or second movable member such as an eject button or a pivot member. A retarding structure on the spring provides a retarding force which is based on the interaction of the retarding structure with a protrusion on an assembly portion to keep the spring orientation intact. The spring is desirably comprised of stainless steel and is a flat wire.

16 Claims, 27 Drawing Sheets

(56) References Cited

U.S. PATENT DOCUMENTS 2,648,129 A * 8/1953 Streeter .................. B26B 21/52 30/526
2,715,267 A 8/1955 Force
2,769,232 A * 11/1956 Leonard, Sr. ........... B26B 21/32 30/60.5
2,821,779 A * 2/1958 Kleinman ............... B26B 21/24 30/40.2
3,052,979 A 9/1962 Franz
3,311,975 A * 4/1967 De Longuyon ......... B26B 21/24 30/62
3,593,416 A 7/1971 Edson
3,605,265 A 9/1971 Iten
3,646,674 A 3/1972 Fitzpatrick
3,653,123 A * 4/1972 King ...................... B26B 21/32 30/58
3,810,305 A * 5/1974 Perry ...................... B26B 21/24 30/47
4,082,375 A * 4/1978 Fortmann ............. F16C 17/042 384/302
4,205,437 A 6/1980 Chen
4,253,235 A * 3/1981 Jacobson .............. B26B 21/521 30/47
4,253,237 A 3/1981 Jacobson
4,797,998 A 1/1989 Motta
4,879,811 A 11/1989 Cooney
5,033,152 A * 7/1991 Althaus ................. B26B 21/225 30/527
5,182,858 A 2/1993 Chen
5,224,231 A 7/1993 Nacar
5,230,407 A * 7/1993 Smith ................... B64C 27/001 267/140.2
5,347,717 A 9/1994 Ts
5,557,852 A * 9/1996 Frisina ..................... B25D 3/00 30/353
5,560,106 A 10/1996 Armbruster et al.
5,639,074 A * 6/1997 Greenhill ................ F16F 1/328 267/158
5,787,594 A 8/1998 Estrada
5,960,923 A * 10/1999 Araki .................. F16D 25/0638 192/109 A
6,062,857 A * 5/2000 Oppawsky .............. B05C 17/01 222/137
6,068,250 A * 5/2000 Hawkins ................. F16F 1/328 267/164
6,223,442 B1 * 5/2001 Pina ...................... B26B 21/225 30/50
6,421,925 B1 7/2002 Wonderley
6,612,040 B2 9/2003 Gilder
6,758,465 B1 * 7/2004 Greenhill .................. F16F 1/06 267/162
8,474,144 B2 7/2013 Royle
9,618,126 B1 4/2017 Lacroix
9,999,981 B2 6/2018 Bunnell
2002/0007558 A1 * 1/2002 McCool .................... B26B 5/00 30/2
2002/0116831 A1 8/2002 Coffin
2003/0027662 A1 * 2/2003 Werner .................. A63B 53/04 473/346
2003/0074798 A1 4/2003 Follo
2008/0111289 A1 * 5/2008 Matsumura ............... F16F 1/06 267/71
2008/0243081 A1 * 10/2008 Nance ................ A61B 17/3439 604/164.03
2009/0000126 A1 1/2009 Kraus
2009/0030380 A1 * 1/2009 Binmoeller ........ A61B 1/00133 604/509
2009/0313837 A1 12/2009 Winter et al.
2010/0043242 A1 2/2010 Stevens
2010/0109377 A1 5/2010 Calco
2010/0132204 A1 * 6/2010 Brown .................. B26B 21/521 30/527
2010/0313426 A1 * 12/2010 Royle ................... B26B 21/522 30/84
2011/0278778 A1 * 11/2011 Qattan ...................... F16F 3/00 267/171
2012/0096718 A1 4/2012 Howell et al.
2012/0096723 A1 4/2012 Howell et al.
2012/0210586 A1 8/2012 Lelieveld et al.
2013/0064568 A1 3/2013 Fujiwara
2013/0081290 A1 * 4/2013 Murgida ............... B26B 21/522 30/527
2013/0097868 A1 4/2013 Jessemey et al.
2014/0262650 A1 * 9/2014 Eppink ................. E21B 17/076 188/297
2014/0265114 A1 9/2014 Laniewicz
2015/0132080 A1 * 5/2015 Tran ........................ F16F 1/328 411/517
2015/0290819 A1 10/2015 Giannopoulos et al.
2015/0360375 A1 12/2015 Wertz
2015/0362036 A1 * 12/2015 Marvuglio .............. F16F 1/328 267/161
2017/0036363 A1 2/2017 Efthimiadis et al.
2017/0165853 A1 * 6/2017 Li .......................... A45D 42/08
2017/0264992 A1 * 9/2017 Wallace ............... H04R 1/1041
2017/0282392 A1 10/2017 Maimone et al.
2018/0133438 A1 * 5/2018 Hulvershorn ...... A61M 25/0113
2018/0141225 A1 * 5/2018 Zucker ................ B26B 21/4062
2018/0223947 A1 8/2018 Shepard
2018/0320747 A1 * 11/2018 Bogrash .................... F16F 9/10
2019/0084169 A1 3/2019 Bonk
2019/0152077 A1 * 5/2019 Kim .................... B26B 21/4012
2019/0152078 A1 5/2019 Jang
2019/0152079 A1 5/2019 Chang
2021/0037914 A1 * 2/2021 Adametz .............. A43B 13/185
2022/0000554 A1 1/2022 Hancock
2022/0196100 A1 * 6/2022 Zheng ..................... F16F 1/328
2022/0241996 A1 8/2022 Bourque et al.

FOREIGN PATENT DOCUMENTS

DE 8515020 U1 7/1985
DE 9316407 U1 1/1994
EP 1671761 A1 6/2006
EP 1671761 B1 * 3/2008 ........... B26B 21/225
GB 2078589 A 1/1982
GB 2116470 A 9/1983
GB 2362849 A * 12/2001 ......... B26B 21/4062
JP 3022590 U 3/1996

OTHER PUBLICATIONS

Extended EP Search Report and Written Opinion for 19165832.7 dated Jul. 9, 2019, 6 pages.
All Office Actions; U.S. Appl. No. 16/368,445, filed on Mar. 28, 2019.
All Office Actions; U.S. Appl. No. 16/368,466, filed on Mar. 28, 2019.
All Office Actions; U.S. Appl. No. 16/368,401, filed on Mar. 28, 2019.
All Office Actions; U.S. Appl. No. 17/679,475, filed on Feb. 24, 2022.

* cited by examiner

RAZOR ASSEMBLY WITH LOOP SHAPED SPRING MEMBER

FIELD OF THE INVENTION

This invention relates to personal care appliances, such as razors and shaving devices, and more particularly to springs for use in such appliances.

BACKGROUND OF THE INVENTION

In many small consumer appliances, such as razors and shaving devices, there is a cartridge component which is permanently or removably attached to a handle. In the case of razors, the cartridge includes the cutting blades. The cartridge and the handle move relative to each other to allow the cartridge to follow the contours of the skin and cut more hairs more efficiently.

The cartridge in many commercially available razors pivots relative to the handle. The pivot mechanisms may be accomplished by a spring or spring mechanism. The pivot mechanism of the prior art generally comprises an up and down (or forward and back) movement of the cartridge relative to the handle while another pivot mechanism of the prior art may generally comprise a side to side (or left and right) movement of the cartridge relative to the handle. Some premium commercial razors incorporate both types of movement such that the cartridge can move both up and down and side to side.

Springs or spring mechanisms may also be included in a component or feature that serves to remove, separate, or eject the cartridge from the handle. For instance, an eject button or release fingers can be found in a razor where the cartridge can be removed from the handle (e.g., the removable type where the cartridge is disposed of but the handle is kept by the consumer). Typically, the eject button or the release fingers have some spring or spring mechanism. The eject buttons of the prior art generally allow for the user to move the button forward from an initial point with the button typically springing back to the same initial point in the process of releasing a cartridge from a handle. This movement is generally along a linear path. Generally, the travel distance that an eject button of the prior art travels is about 1 mm to about 2 mm.

Many current razors use coil springs or straight springs (e.g., a straight beam) to assist in the eject or pivot functionality. These springs generally occupy a lot of volume and their short length does not allow for large deflections, bending, or long travel distances without exceeding the yield stresses and strains of the spring. If an increase in user benefits is desired in the razor which would require space, the spring members of the prior art may be inadequate due to fatigue or permanent deformation.

Further, the springs of the prior art are generally separated per function, such that there is typically a spring utilized for pivot movement and a different one for eject movement.

Often, if a razor is accidentally dropped, many components of the razor may be damaged. For instance, the cartridge or blades may bend or fall out of place, the eject button may not be able to move appropriately thereafter, or the spring or spring mechanism helping pivot or eject functions may be compromised. Subsequently, the razor may become unsafe for a consumer to use.

Thus, the prior art springs and spring mechanisms have some disadvantages in cost, size, shape, capability, and complexity. First, in many prior art devices, as mentioned above, having separate springs for different razor functions such as pivoting and ejection, adds components and thus cost and complexity to the device. In some instances, when additional benefits are added to the razor, the current springs or spring mechanisms may be inappropriate. Further, the spring capabilities and the eject function may diminish with use and with accidental drops.

A robust and improved spring member and spring mechanism and components to provide desired functionalities in a razor is needed which also provide the consumer with a much more pleasant operational experience.

SUMMARY OF THE INVENTION

The present invention is directed to a razor including a loop shaped spring member disposed in an assembly with a movable member. In one aspect, the spring member is mounted inside the movable member.

In another aspect, the movable member assembly is a pivot member, an eject member, an eject button, or any combination thereof. The button ejects a razor cartridge from the handle.

In one embodiment, the movable member assembly moves a razor cartridge in one or more directions relative to a razor handle. In one aspect, the movable member assembly is a portion of a razor handle. In another aspect, the movable member assembly is a portion of a razor cartridge.

In another embodiment, the loop shaped spring member includes two end portions having distal ends. The end portions of the loop shaped spring member overlap. The length of the overlapping portions is about 5 mm to about 40 mm, up to about 180 degrees of 360 degrees, or a combination thereof. In other aspects, the two distal ends are spaced apart or do not contact each other. In another embodiment, one or both of the distal ends are curved. In one aspect, the curved distal ends curve into a center of the loop shaped spring member. Further, one or both of the distal ends is unsupported.

In one aspect, the loop shaped spring member is supported in the movable member assembly. In another aspect, the loop shaped spring member moves freely in the movable member assembly.

In one embodiment, the loop shaped spring member includes one or more retarding structures. In one aspect, the retarding structure includes a knob, protrusion, recess, notch, divot, or point of any size and structure having a curved or linear profile or any combination thereof in the loop spring member. The knob includes a curved profile. In one aspect, the knob has radii of curvature between about 0.5 mm to about 4 mm. In one aspect, the retarding structure extends into a center of the loop spring member or the retarding structure extends out from a circumference of the loop spring member. In another aspect, the retarding structure is disposed generally opposite the overlapping portion.

In the present invention, the loop shaped spring member is a substantially closed loop. The shape of the loop shaped spring member includes an oval, circle, elliptical, ring shape, modified V-shape, tear drop shape, or any combination thereof. In one aspect, the loop shaped spring member has an overall length of about 30 mm to about 90 mm when straightened. In one aspect, the loop shaped spring member has radii of curvature between about 1 mm to about 12 mm.

The loop shaped spring member in a preferred embodiment of the present invention is made of stainless steel. The loop shaped spring member can be a flat wire.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

Other features and advantages of the invention will be apparent from the following detailed description, and from the claims.

BRIEF DESCRIPTION OF THE DRAWINGS

While the specification concludes with claims particularly pointing out and distinctly claiming the subject matter which is regarded as forming the present invention, it is believed that the invention will be better understood from the following description which is taken in conjunction with the accompanying drawings in which like designations are used to designate substantially identical elements, and in which:

DETAILED DESCRIPTION OF THE INVENTION

Figure 1A:
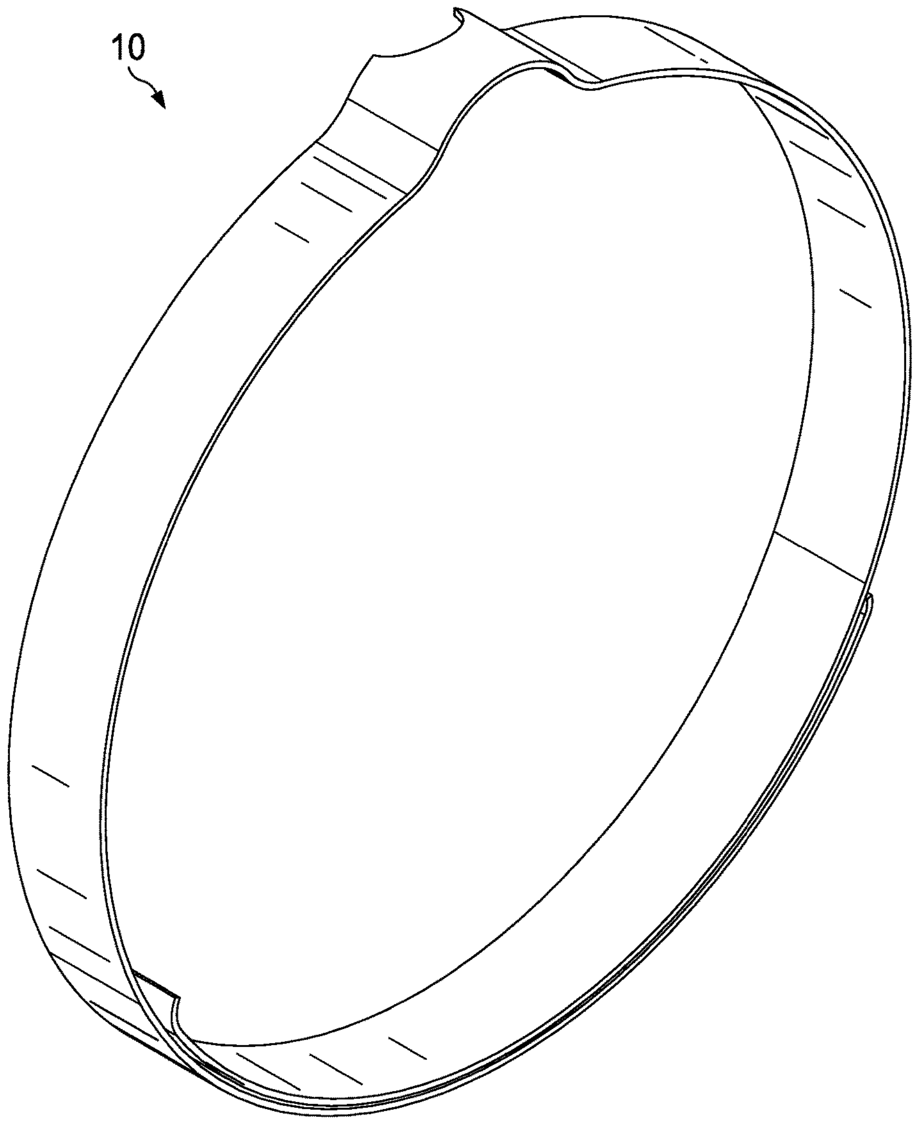
FIGS. 1A-1D are schematics of various embodiments of loop spring members in accordance with the present invention.
Figure 1B:
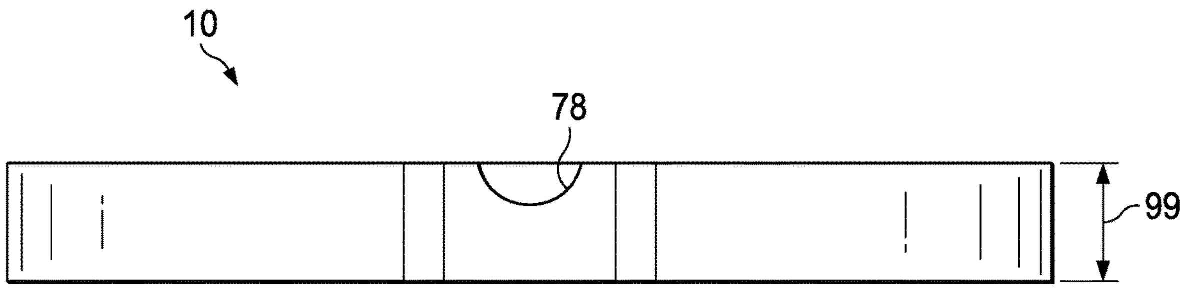

The novel spring members or spring mechanisms of the present invention are described herein. A loop-shaped spring member of the present invention provides many advantages in a razor. For instance, the eject functionality of many razors includes a button that is moved forward a travel distance to reach a component or surface of the cartridge to eject or release a cartridge from a handle. The eject button may need to travel a long travel distance (e.g., a long ejection stroke) to reach the cartridge and a long distance to return to a rest position. A long distance may be a distance greater than 2.5 mm and usually in the 4 mm to 10 mm range. The eject button in many razors is disposed in a small space in the razor. The spring member of the present invention having a loop shape provides many advantages to a razor with eject mechanisms. For one, the loop shape allows extension and compression to occur without exceeding the yield strains and stresses of the spring member. The fatigue of the spring member is reduced. The loop shape also allows large extension and compression with low forces that are consumer acceptable while providing enough force to return the eject button to its rest position reliably. The loop shape can be configured in a variety of sizes that provide design flexibility. The loop shape enables the spring functionality to be placed at the periphery of the eject button, advantageously leaving other areas including the center of the eject button available for other functionality.

Additionally, many razors have spring members to provide pivot functionality. Many razors use coil springs or straight springs (e.g., a straight beam) to assist in the pivot functionality. These springs generally occupy a lot of volume and their short length does not allow for large deflections, bending, or long travel distances without exceeding the yield stresses of the spring. When pivoting about 12 or more degrees in either direction, if the spring length is shorter, the stress on the spring, and in particular at a location where it is fixed, can be large and the spring may permanently deform. The longer the spring or beam, as in the present invention, the more the amount of deflection can be distributed across the beam. Accordingly, the loop shape spring member of the present invention not only generally takes up a small volume or less critical volume than the coil or straight spring due to its length being formed into a circle, but also it provides enhanced beam bending due to its longer length and reduces fatigue on the spring. Further, as noted above, by having the spring form into a loop shape at a periphery of an assembly, extra space is provided for other functionality to be disposed therein including, but not limited to, a benefit delivery system, or other enhancements for a user.

The spring mechanisms of the present invention can be advantageous for a non-limiting embodiment of a razor which includes an interconnect member flanked by a cartridge and handle where the interconnect member can provide benefits to a consumer's skin. Such a skin interconnect member (reference 75 in FIG. 7A can be disposed on the razor handle and can be in a pivotal relationship to the main body of the handle and this structure can be joined or fixed to the razor cartridge.

Having a pivoting skin interconnect member in an area very close to the razor cartridge presents numerous challenges which are mitigated with the spring member and mechanisms of the present invention. By having an interconnect member so close to the cartridge, an area typically devoted to providing ejection and pivoting functionalities, the location of one or both eject and pivoting mechanisms would necessarily be relocated, e.g., disposed further back on the handle. For instance, where current eject members, to force detachment of a razor cartridge, typically travel distances of about 1 mm to about 2 mm to detach a razor cartridge, a razor having a skin interconnect member which may be located from about 2.5 mm to about 8 mm away from the razor cartridge, typically about 3 mm away, would, to detach the cartridge, need to travel a distance from about 3 mm to about 10 mm of travel, typically about 5 mm. This long distance of travel requires a spring mechanism capable of adequately returning the moving member of the cartridge eject mechanisms to the rest position. The loop shaped spring member of the present invention achieves the long travel needed to maintain low stresses during use to avoid permanent deformation or fatigue failure while also providing such travel with low forces exerted by consumer.

The spring mechanism of the present invention is desirably disposed in an assembly or a member of a razor, preferably in a movable member in the assembly. The spring mechanism of the present invention is disposed within a movable member assembly.

A “movable member” or “movable member assembly” as used herein signifies a member on the razor comprising one or more movable portions capable of moving or providing a motion functionality for the razor. For instance, the movable member assembly of the present invention may preferably be a pivot mechanism (e.g., angular or rotational motion, side to side motion) or a release or ejection mechanism or a combination thereof.

The term “spring”, “spring mechanism”, or “spring member” as used herein, signifies any type of mechanical spring, such as a compression spring, a leaf spring, or any feasible spring or combination thereof.

The spring member of the present invention generally has a loop shape or a modified V-shaped loop spring as will be described below.

Any loop shaped spring member of the present invention, when straightened, desirably has an overall length of about 30 mm to about 90 mm and preferably about 65 mm.

The spring mechanism of the present invention is based on an interaction between a movable member in an assembly attached to the cartridge or handle of the razor and the spring member. During the pivot or eject functions, the spring member offers a resistance that is a function of its preload compression, its spring constant and the geometry of the bottom structure, and depending on the intensiveness of that resistance, the effect will be larger or smaller.

The term “loop” as used herein signifies a generally curved, circular shape, which may form a loop. Non-limiting loops of the present invention comprise oval, circle, elliptical, ring shape, modified V-shape, tear drop shape, or any modification or combination thereof. The loop may be split and the loop itself, the end portions or distal ends of the loop can be unconnected or free, unsupported, connected or mounted, or overlap each other. The distal ends can be facing towards each other or can be facing away from each other.

The loop of a loop spring member of the present invention desirably has radii of curvature ranging from about 1 mm to about 12 mm and more preferably about 7.5 mm. The loop diameter can be from about 10 mm to about 25 mm, preferably about 15 mm. Generally, the size of the loop spring member is such that it may fit on a person’s fingertip.

The spring member of the present invention may also preferably include one or more retarding structures such as a knob or point. The terms “knob”, “protrusion”, “recess”, “notch”, “divot”, or “point” as used herein may signify any size structure of any geometrical shape, e.g., having a curved, rounded, or linear profile or any feasible combination thereof.

The term “angled” as used herein may signify a surface that has an angle or angles, is disposed at a slant or bent at an angle, which may or may not be linear.

The term “flat” or “flat areas” as used herein may signify a surface that is horizontally level, generally not slanted, even, or without marked projections or depressions.

The type of material chosen for the spring member is generally important for its ability to provide a flexible or elastic performance. In addition, the spring is desirably comprised of metal to provide a durable, long-lasting spring member. The spring member of the present invention is preferably comprised of stainless steel.

In one embodiment, the spring is comprised of any type of hard metal. In a preferred embodiment, the spring member is comprised of stainless steel. The stainless steel of the spring member of the present invention desirably has an engineering yield stress of about 800 MPa to about 2200 MPa, preferably between about 1000 MPa to 2080 MPa, and more preferably about 1000 MPa to about 1600 MPa. The type of material of the spring member of the present invention is a stainless steel defined by 301 Super Full Hard Temper. The engineering yield stress is determined by the ASTM standard E8 using a 0.2% off-set method. Preferably, the spring of the present invention is comprised of a flat wire as opposed to a slit strip to avoid slitting burr on the edges of the component.

Referring to FIGS. 1A-1D, an exemplary spring member 10 in accordance with the present invention is shown. As shown, spring member 10 is a generally circular shape with end portions 12*a* and 12*b*. End portion 12*a* includes a distal end 12*a*' and end portion 12*b* includes a distal end 12*b*'. Distal ends 12*a*' and 12*b*' are free ends. End portions 12*a* and 12*b* are not joined together and distal ends are not joined together. End portions 12*a* and 12*b* overlap forming an overlapping portion 13.

The spring member 10 has a thickness 98 of about 0.05 mm to about 0.25 mm, and preferably about 0.10 mm; a height 99 of about 1.0 mm to about 4.0 mm, and preferably about 1.7 mm; and a radius of curvature 79 along the loop of about 1 mm to about 12 mm, and preferably about 7.5 mm.

The overlapping portion 13 is desirably curved and generally encompasses approximately 90 degrees of a 360-degree circle, assuming the spring member to be effectively a full circle. The overlapping portion may alternately be larger or smaller. The overlapping portion 13, when straightened out, has a length of about 5 mm to about 40 mm, and preferably about 16 mm.

Figure 1D:
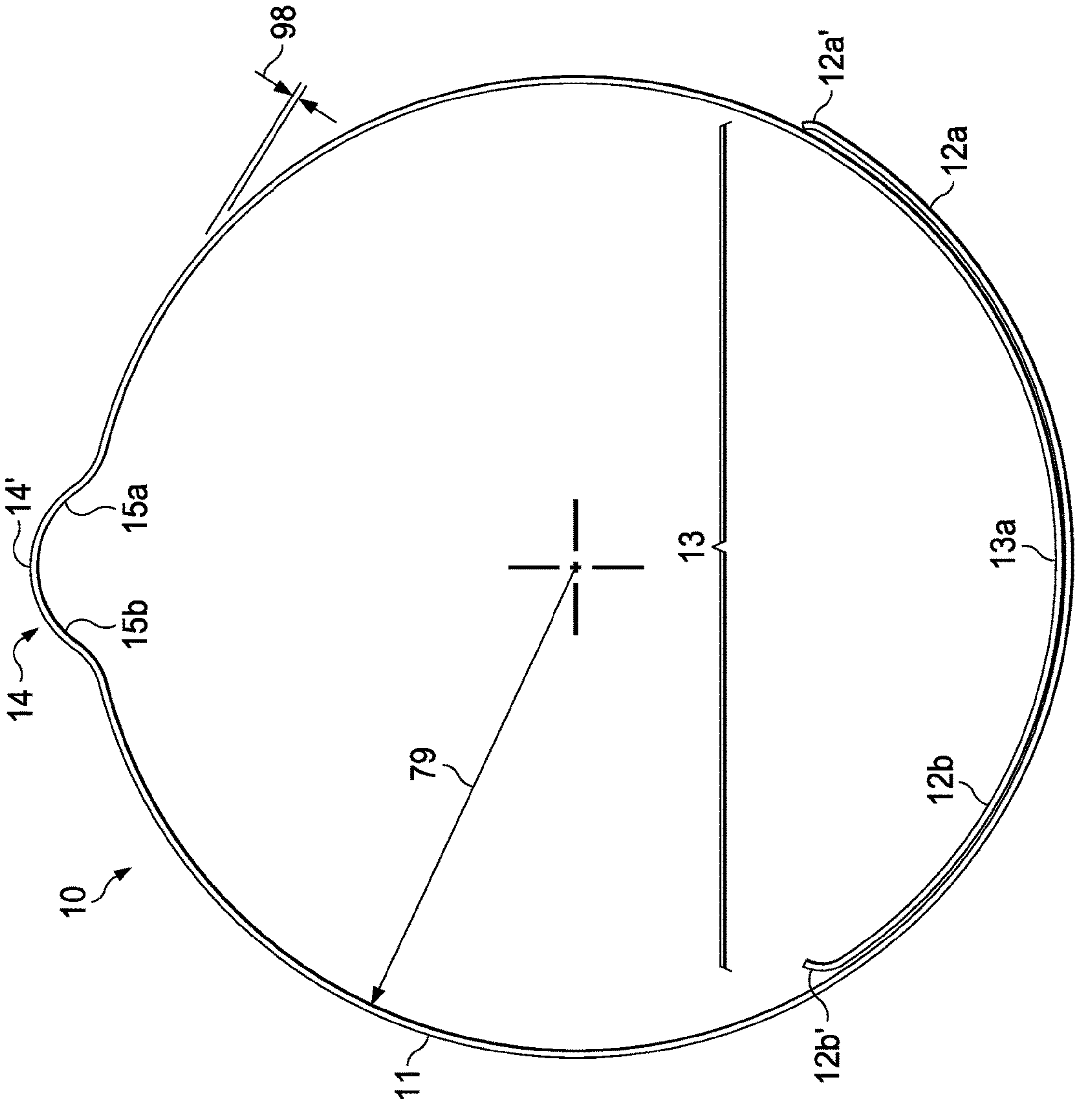
Figure 1C:
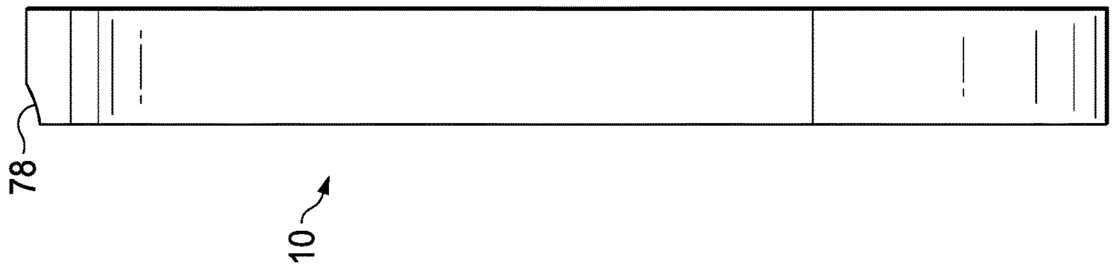

At least one knob is preferably disposed anywhere on the spring member of the present invention. As shown in FIG. 1D, the knob 14 extends outward from the overall circumference 11 of the loop of the spring member 10. The knob 14 is disposed substantially directly opposite or across from the end portions or the overlapping portion 13. The knob 14 may preferably be disposed substantially across from a center point 13*a* or area of the overlapping portion 13.

The knob 14, as shown, has a curved profile 14'. The knob 14 is also shown as having angled side portions 15*a* and 15*b*. The function of the knob is to assist in retarding or preventing spin or full movement of the spring member at the location of the knob as it sits within a razor bottom structure. This function will be described in more detail below.

FIGS. 2A-2D depicts one embodiment of the geometry of the knob 14 of the spring member 10 of FIG. 1 which desirably provides optimal functionality.

As indicated in FIGS. 2A-2D, a radius of curvature 22 of the knob 14 may preferably be in the range of about 0.5 mm to about 4 mm, and more preferably about 1.5 mm.

In addition, an optimal length 26 for each angled side portion 15*a* and 15*b* ranges from about 0.5 mm to about 5 mm, and preferably about 1.0 mm. Angle A ranges from 80 degrees to 150 degrees and is preferably about 135 degrees. Any feasible length for the side portions is contemplated by the present invention. Angled side portions 15*a* and 15*b* are generally desirably symmetrical, though asymmetrical portions are also contemplated in the present invention.

A height 24 of the knob may preferably be determined from a bottom point 24*a* of the knob 14 (where the knob joins the circle loop of the spring member 10) to a highest point 24*b* of the curved profile 14'. The desired knob height 24 is in the range of about 0.5 mm to about 2.0 mm, and more preferably at about 0.9 mm.

The knob and the angled side portions may desirably each have one or more cutouts or apertures 78. While not required for the present invention, apertures may generally provide some advantages such as homogenizing the strength on the angled portions during the compression of the spring member, providing an extra locking or retention feature, and providing a guiding feature for manufacturing.

Figure 2A:
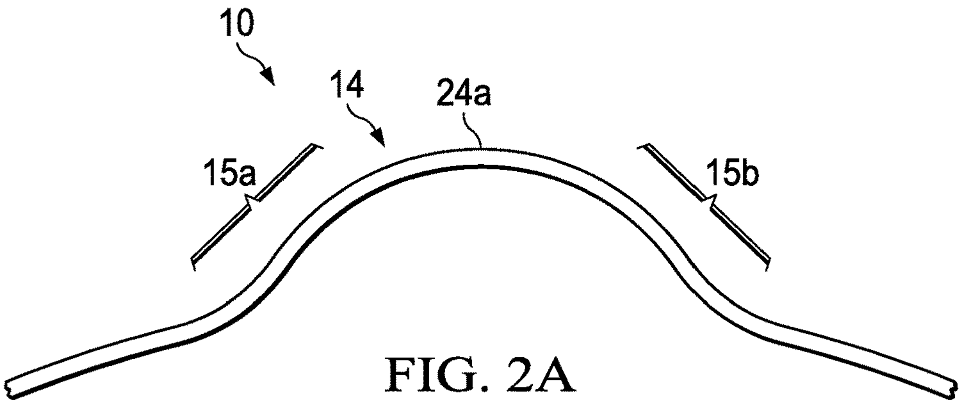
FIGS. 2A-2D are schematics of knobs of the present invention.
Figure 2B:
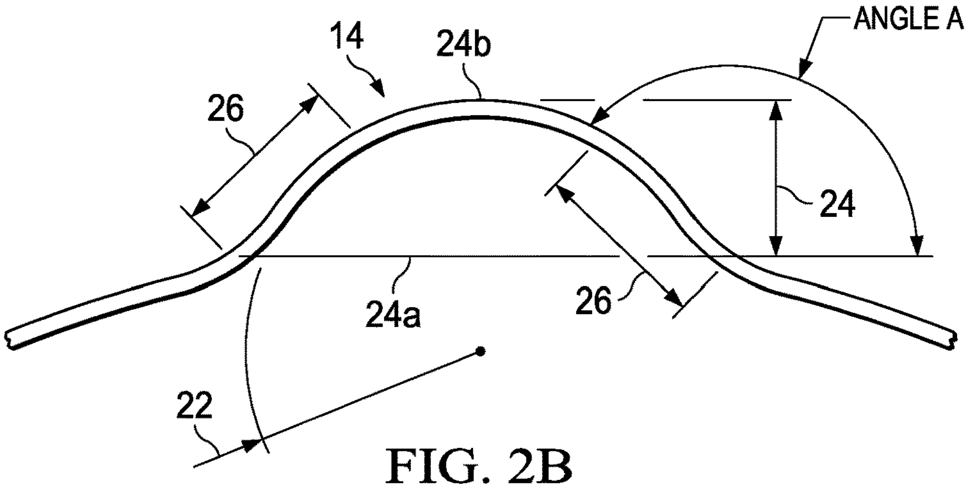
Figure 2C:
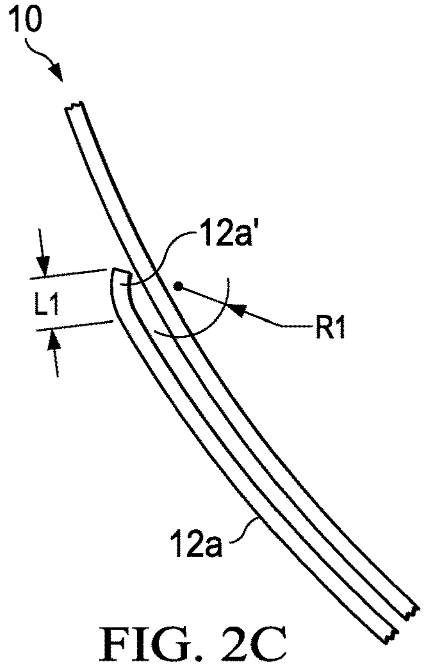
Figure 2D:
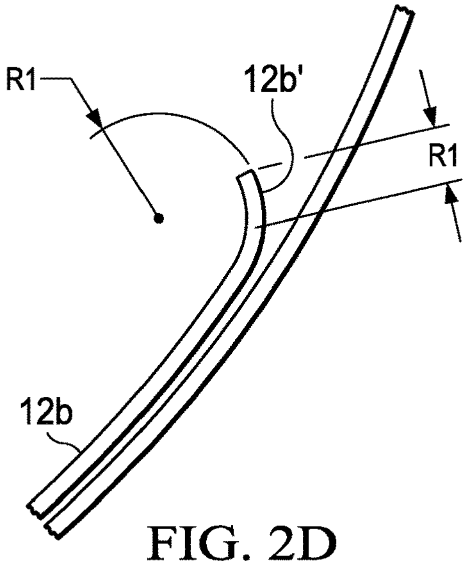

FIGS. 2C-2D depicts close-up views of the distal ends 12*a*' and 12*b*'. As shown, the distal ends are curved. In a non-limiting embodiment, they may be curved inward or into the center of the loop as shown. The curved nature of the distal ends provides for ease of motion of the loop spring member overall (e.g., under compression and tension) without jamming or sticking into itself or other features in the razor. Typical radii of curvature R1 for the distal ends ranges from 0.25 mm to 5 mm, preferably about 0.4 mm. Typical lengths L1 of the distal ends range from 0.2 mm to 1 mm, preferably about 0.3 mm.

Other embodiments of spring members are contemplated in the present invention. For example, in FIGS. 3A-3B, the shape of the spring members 30*a* and 30*b* is a loop shape having a modified V-shape or tear drop shape, as opposed to the more circular shape of FIG. 1A. Spring member 30*a* has loop end portions 32*a* and 32*b* with distal ends 32*a*' and 32*b*' respectively. While the end portions 32*a* and 32*b* with distal ends 32*a*' and 32*b*' are not joined or connected together, they also do not overlap. End portions 32*a* and 32*b* can be spaced apart by about 5.00 mm or approximately by about 60 to about 90 degrees of a 360-degree circle as shown by gap 39 in FIG. 3A. In a non-limiting embodiment of the invention, the length 36 of spring member 30*a* can range from about 10 mm to about 40 mm, and more preferably be about 21 mm. In a non-limiting embodiment, the width 37 of spring member 30*a* can range from about 10 mm to about 40 mm, and more preferably be about 18 mm. When straightened the length of the spring member may range from about 30 mm to about 90 mm.

Spring member 30*b* has loop end portions 34*a* and 34*b* with distal ends 34*a*' and 34*b*' respectively. While the end portions 34*a* and 34*b* with distal ends 34*a*' and 34*b*' are not joined together, they do overlap. The overlapping portion 33 encompasses the area where the two end portions overlap. The overlapping portion 33 is desirably curved and generally encompasses an Angle B up to about approximately 180 degrees of a 360-degree circle, and preferably about 90 degrees assuming the spring member to be effectively a full circle. Alternatively, if feasible, the overlapping portion may be larger or smaller. The overlapping portion 33, when straightened out, desirably has a length of about 5 mm to about 30 mm, and preferably about 15.5 mm.

Spring members 30*a* and 30*b* of FIGS. 3A-3E can comprise a small curved profile, notch, pointed portion or protrusion as shown by 31*a* and 31*b*. The notches 31*a* and 31*b* both extend outwardly but could also extend inwardly (not shown). As with FIGS. 1A-1D, the notches 31*a* and 31*b* are disposed substantially opposite the overlapping portion 33 (in the case of spring member 30*b*) and opposite the center 35 of the gap 39 between distal ends 32*a*' and 32*b*' in spring member 30*a* (in the case of spring member 30*a*).

Figure 3B:
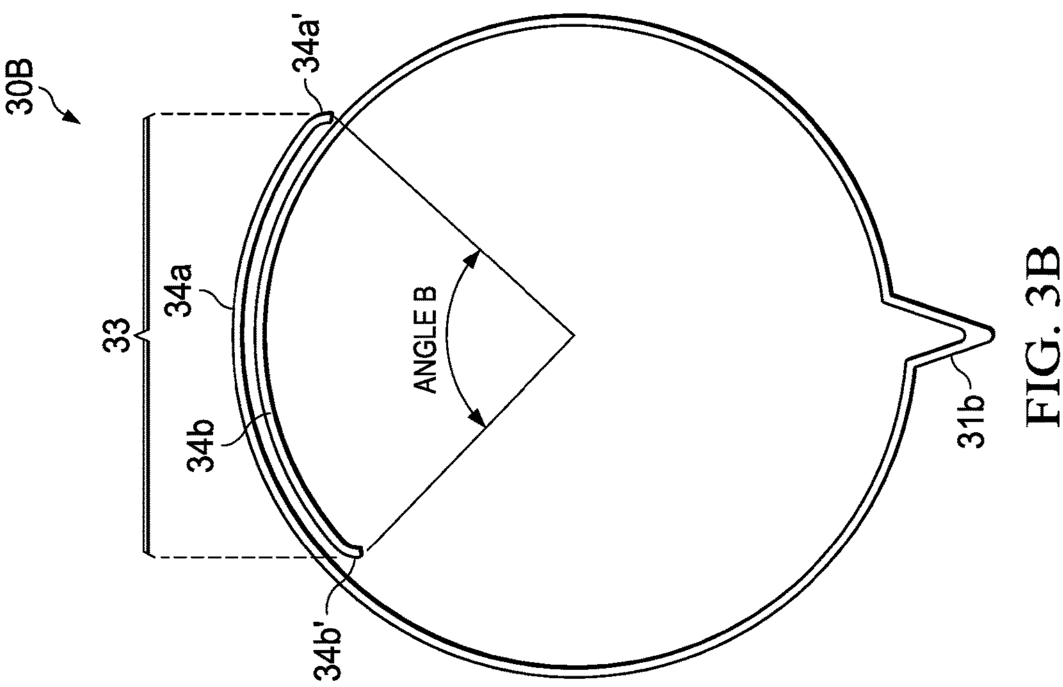
FIGS. 3A-3E are schematics of alternate embodiments of spring members of the present invention.
Figure 3A:
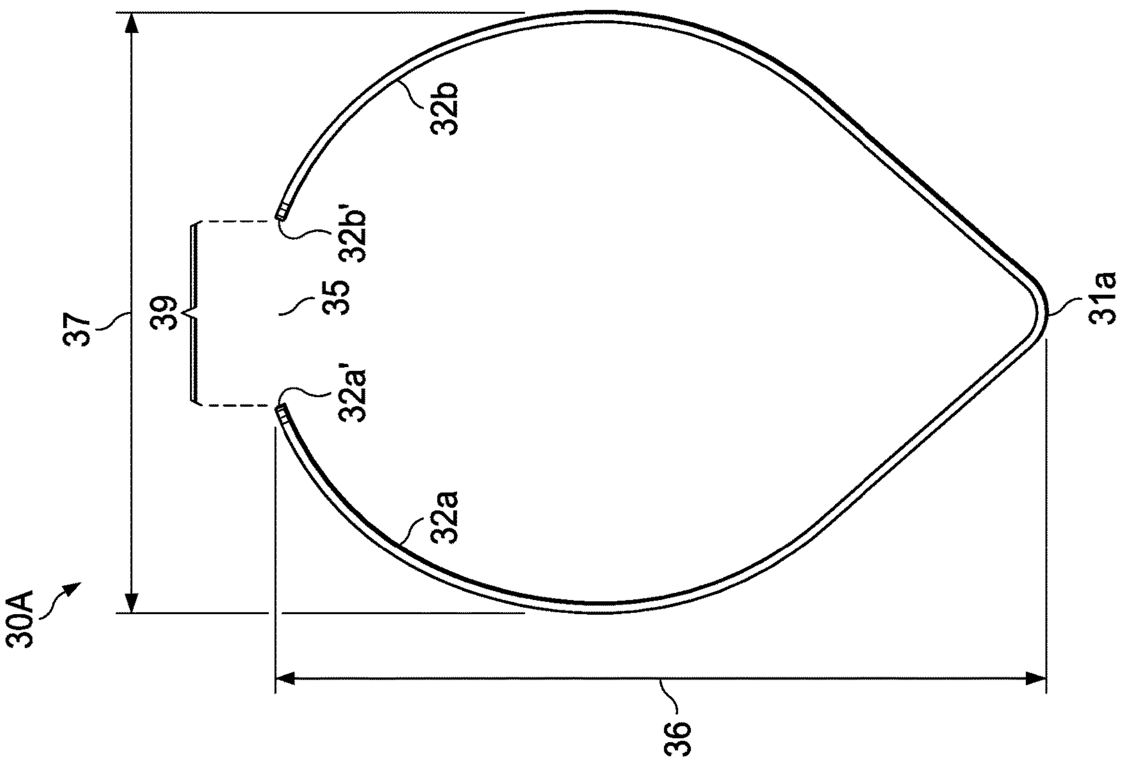
Figure 3E:
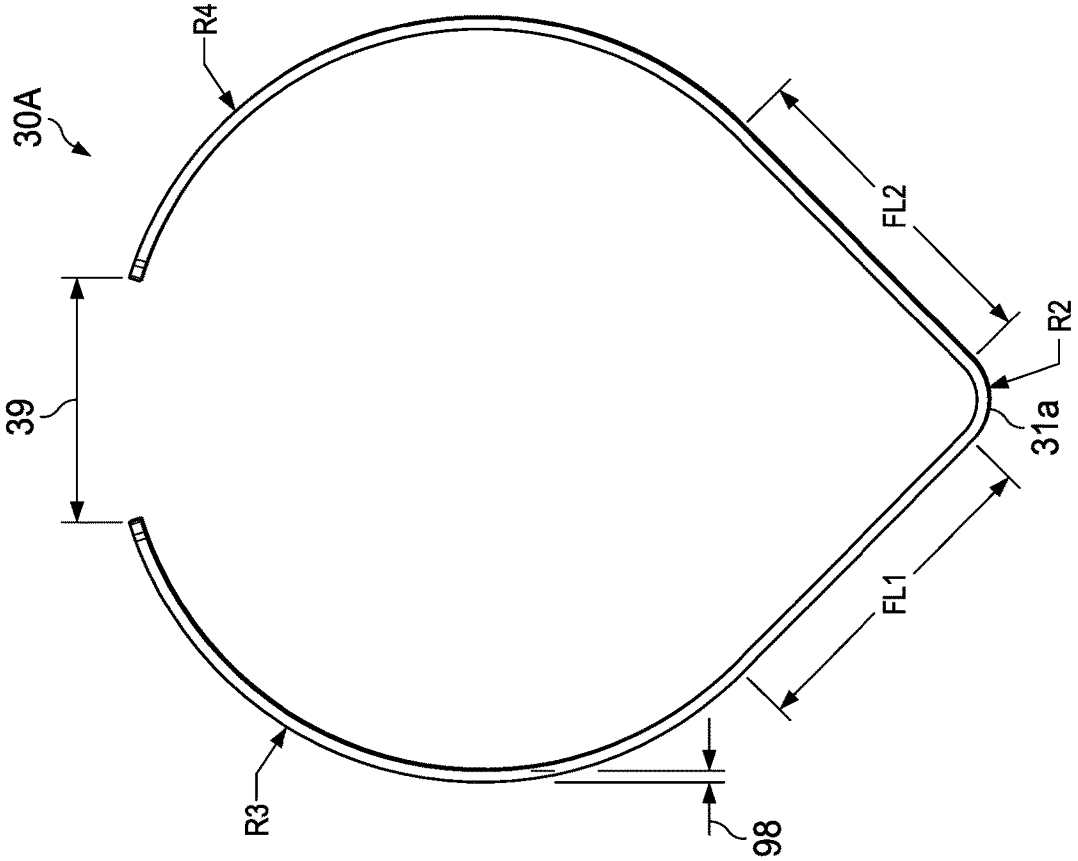
Figure 3D:
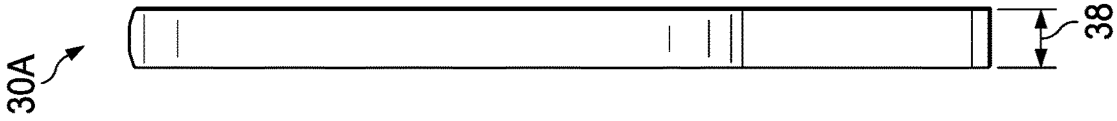
Figure 3C:
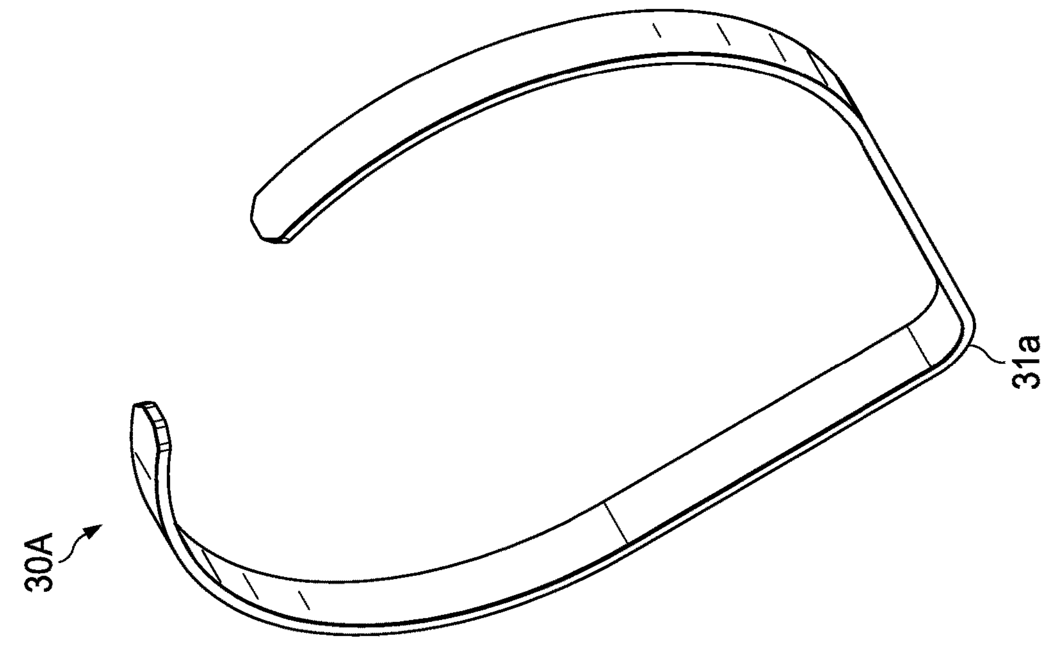

As shown in FIGS. 3A-3C, the spring member 30*a* may have a height 38 ranging from about 1.00 mm to about 3 mm, and preferably about 1.7 mm. In a non-limiting preferred embodiment of the invention, the height 38 of the spring member is uniform throughout the loop. The thickness 98 of the spring member 38 can be about 0.05 mm to about 0.25 mm and preferably about 0.1 mm. A radius of curvature R2 of the protrusions 31*a* may be about 1.0 to about 2.0 mm, and preferably about 1.53 mm. A radius of curvature R3 and R4 of the end portions may be about 5.0 mm to about 15.0 mm, and preferably about 8.95 mm. The radius of curvature R2 and R3 can be the same value or can be different values. Flat areas FL1 and FL2 generally converge toward the protrusion 31*a* from either side. The length of these flat areas may range from about 6 mm to about 9 mm, and preferably be about 7.95 mm. In a non-limiting embodiment, FL1 and FL2 are the same value.

Figure 4C:
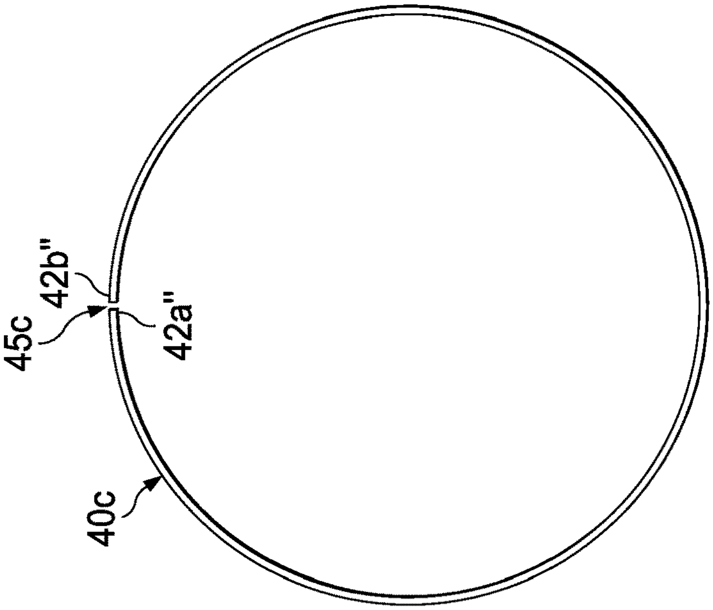
FIGS. 4A-4C are schematics of alternate embodiments of spring members of the present invention.
Figure 4B:
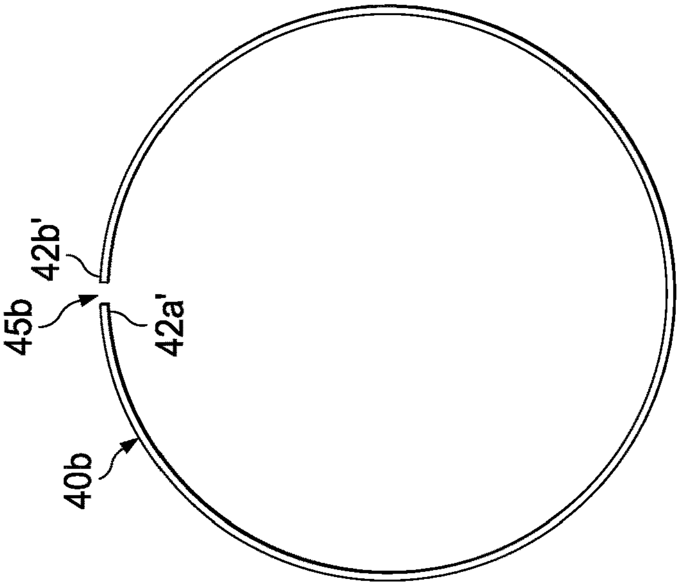
Figure 4A:
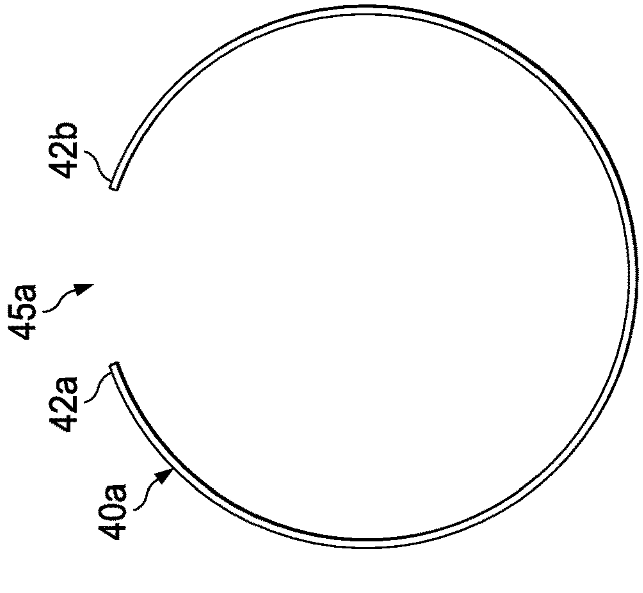

Turning to FIGS. 4A-4C, circular loop spring members 40*a*, 40*b*, and 40*c* that are split in that, as shown, distal ends have a gap between them of varying sizes such that the end portions and distal ends do not overlap and are also not joined. Spring member 40*a* has the largest gap 45*a* between distal ends 42*a* and 42*b* followed by spring member 40*b* which has a medium sized gap 45*b* between distal ends 42*a*' and 42*b*' and then by spring member 40*c* which has a very small gap 45*c* between distal ends 42*a*" and 42*b*". Though not limited to these shown embodiments, there are no knobs or notches or other protrusions disposed on the spring members 40*a*, 40*b*, and 40.

Figure 5B:
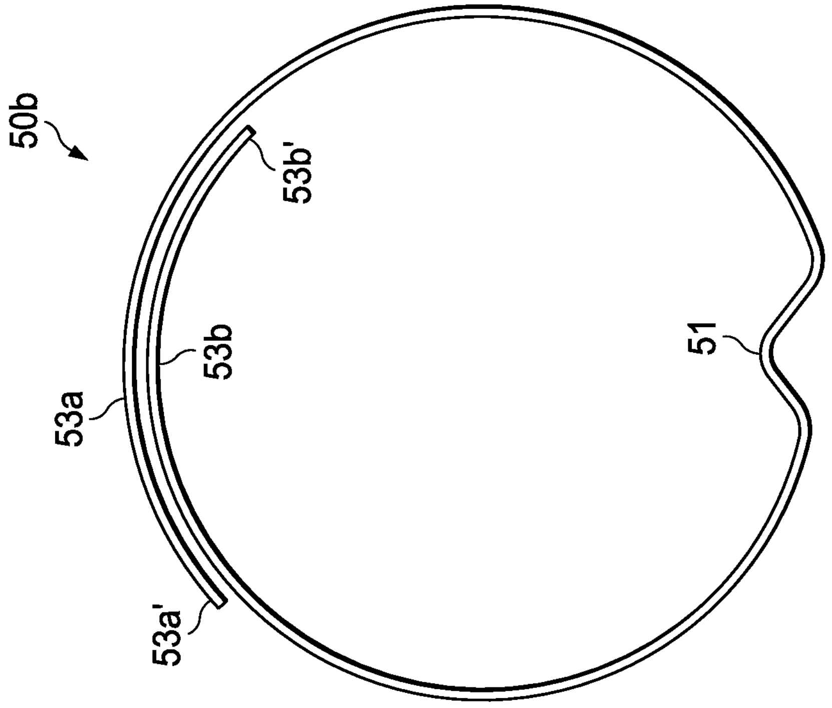
FIGS. 5A-5B are schematics of alternate embodiments of knobs of the present invention.
Figure 5A:
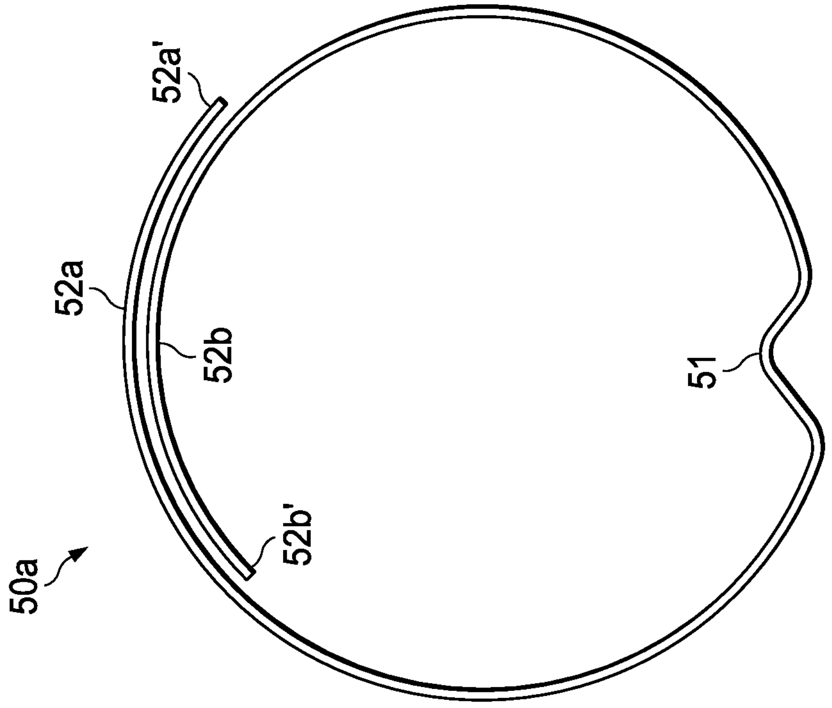

The protrusion of the present invention may alternatively extend inwardly as shown in FIGS. 5A-5B where knobs 51 are shown to extend internal to both loop spring members 50*a* and 50*b*. The geometry, dimensions, and functionality of knobs 51 would substantially be the same as that of knob 14 of FIGS. 1A-1D and 2A-2D.

It should be noted that spring member 50*a* has a similar arrangement of end portions and distal ends as the spring member 10 of FIGS. 1A-1D in that, in spring member 50*a* of FIGS. 5A-5B, the end portion 52*a* sits over or overlaps end portion 52*b* and the end portion 52*b* is disposed underneath end portion 52*a* such that the distal end 52*a*' faces to the right of the page and such that the distal end 52*b*' faces to the left of the page, and extending internal to the loop spring.

In an alternate embodiment shown in FIGS. 5A-5B, spring member 50*b* depicts the end portion 53*a* over or overlapping end portion 53*b* and the end portion 53*b* is depicted underneath end portion 53*a* such that the distal end 53*a*' faces to the left of the page and distal end 53*b*' faces to the right of the page, the latter end extending internal to the loop spring.

Figure 6B:
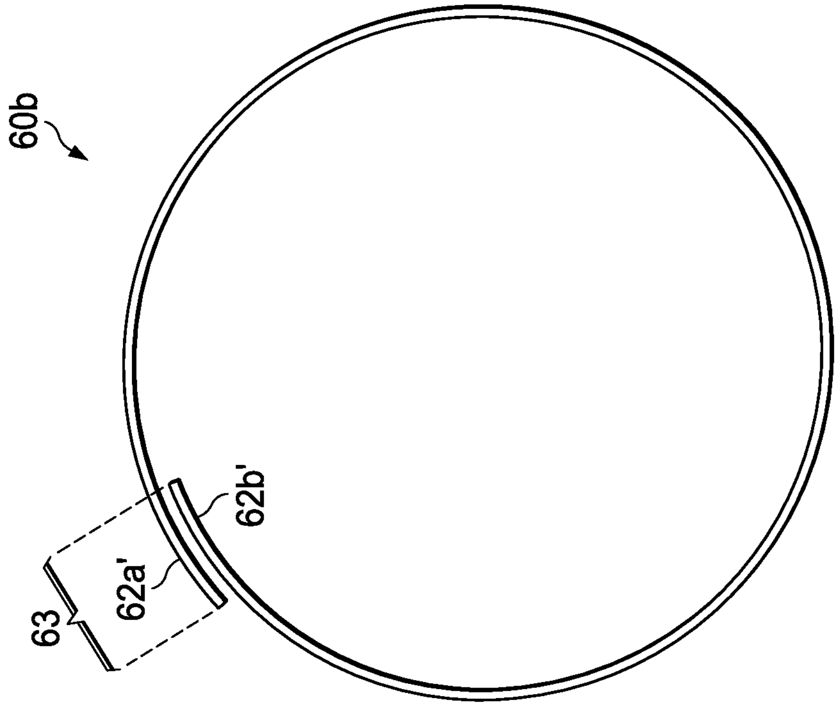
FIGS. 6A-6B are schematics of alternate embodiments of spring members of the present invention.
Figure 6A:
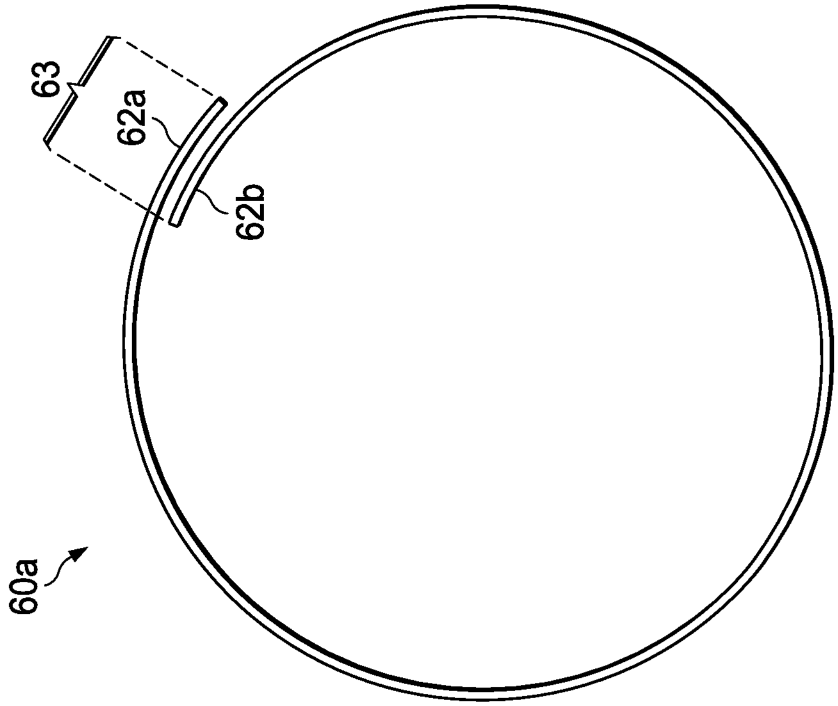

FIGS. 6A-6B depicts an alternate embodiment of spring members of the present invention. Spring member 60*a* includes end portions 62*a* and 62*b* that overlap forming an overlapping portion 63 which is smaller and offset to the right as compared to FIGS. 1A-1D, whereas spring member 60*b* includes end portions 62*a*' and 62*b*' that overlap forming an overlapping portion 63 which is smaller and offset to the left as compared to FIGS. 1A-1D. Though not shown as having a knob or notch, these spring member embodiments may also include one or more of these elements.

Thus, it is noted that the spring member of the present invention can be a loop shape with or without a protrusion, knob, or notch, and with or without overlapping end portions or distal ends such that the end portions or distal ends are not joined.

Figure 7A:
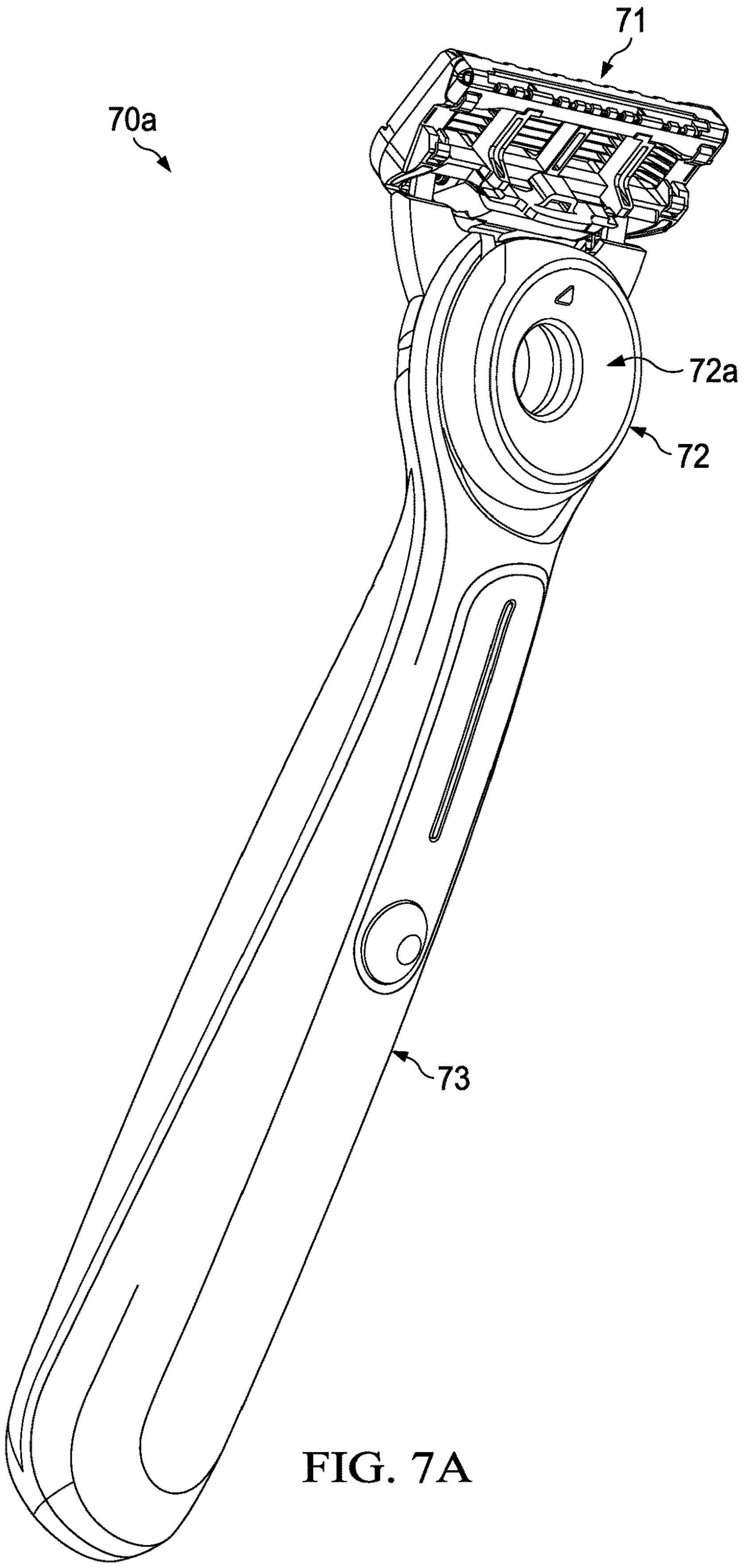
FIGS. 7A-7C are depictions of a razor comprising spring mechanisms of the present invention.

The spring member of the present invention, including a knob extending outwardly (such as the spring member 10 of FIGS. 1A-1D), is incorporated into a razor 70 having a razor cartridge 71 and a razor handle 73 and a movable member assembly 72. A top view 70*a* of a 70 razor is shown having a first movable member assembly 72*a* while a bottom view 70*b* of a razor 70 is shown having a second movable member assembly 72*b*. The movable member assembly 72*a* may be coupled to the movable member assembly 72*b* forming one movable member assembly 72. A razor 70*c* having a cartridge 71 released or ejected from a handle 73 is shown in FIG. 7A. Also shown in FIG. 7A is a skin interconnect member 75 which can provide benefits to a user's skin and can pivot relative to the handle. The razors shown in FIGS. 7A and 7B may be the same razor or different razor. Exemplary razors, skin interconnect members, springs, and components thereof, are described in U.S. Docket Nos. 62/650,295, 62/650,296, 62/650,297, 62/650,298, 62/650,299, 62/650,300, 62/650,301, 62/650,302, 62/650,303, 62/650,305, 62/650,306, 62/650,308 and 62/650,310 which are hereby incorporated herein by reference.

The spring member is desirably incorporated into at least one portion of the movable member assembly 72, such as movable member assembly 72*a* or movable member assembly 72*b*.

The movable member assembly 72 of the razor 70 may preferably be comprised of a release or ejection mechanism, a pivot mechanism, or both mechanisms. The ejection mechanism may release or eject a cartridge from a razor handle. The pivot mechanism may provide a rotational or side-to-side motion of the cartridge relative to the handle. Details of the operation of the spring member assisting in the eject functionality (e.g., eject button) or pivot functionality (e.g., pivot member) will be described below.

Turning first to FIGS. 8A-8F and 9A-9I, the movable member assembly 72*a* comprises an eject button. The eject button comprises an upper portion 82 and a lower portion 84. Spring member 92 is disposed within the movable member assembly 72*a* as it is shown in FIGS. 9A-9I. The eject button can be designed to travel forward (towards the cartridge) a long distance from about 2.5 mm to about 10 mm. The eject button can also be designed to travel backwards (away from the cartridge) a distance from 0.25 mm to about 5 mm. FIGS. 8A-8F and 9A-9I show an embodiment with a travel distance of 5 mm forward and 2 mm backwards.

FIGS. 8A-8F depicts the exterior surfaces of the upper and lower portions 82 and 84, respectively while FIGS. 9A-9I depicts the interior surfaces of the upper and lower portions 82 and 84, respectively. For instance, FIGS. 9A-9I depicts where and how the spring member 92 is generally disposed on the underside 91*a* of the upper portion 82 and where and how the same spring member would be disposed on the top side 91*b* of the lower portion 84. For clarity, the present invention contemplates preferably one loop spring member 92 in the eject button assembly 72*a*.

The eject button is pushed forward with a force from a rest position to a fully extended position. In the ejection mechanism of the present invention, the force is preferably the linear movement forward or the force required to push the eject button generally forward (e.g., typically with a user's finger). The linear movement path forward has the effect of pushing the upper portion 82 into the rear of the cartridge 71 thereby removing or separating the cartridge 71 from the handle 73. In the fully extended position, the cartridge 71 will be released from the handle 73. At this point, the total force F of the eject button 72*a* (e.g., upper portion 82) will be about 2.5 Newtons. The button will have traveled a distance forward (toward the rear of the cartridge) of about 5 mm.

A nose is disposed on a portion of the movable member assembly. The nose may be a distance from about 3 mm to about 9 mm from a razor cartridge. In a non-limiting embodiment, a nose 81 can be disposed on the upper portion 82 as shown in FIG. 11C and will, under force F and along an eject plane, contact a surface on a rear side 71*a* of the cartridge, substantially in a center area 112 (as shown in FIGS. 11B and 11C) to eject the cartridge from the handle.

In a further non-limiting embodiment, nose 81 has a bevel 81*a*. Bevel 81*a* can be disposed at a distal end of the nose 81. The bevel can provide clearance for a pivotal movement of the type described herein for a razor cartridge 71 to the handle. The bevel can be angled upwards under the nose.

In FIGS. 8A-8C and 9A-9C, top and bottom views of the movable member assembly 72*a* are shown at various stages. In FIGS. 8 and 9, Stages (A), (B), and (C) show exterior and interior views, respectively, of the eject button upper portion 82 as it travels forward vis-A-vis the lower portion 84. Stage (A) depicts the eject button 72*a* in a rest position, Stage (B) depicts the eject button 72*a* in a middle or half-way extended position, and Stage (C) depicts the eject button 72*a* as it would look in a fully extended position. As noted, the fully extended position can generally be up to about 10 mm in the present invention.

The bottom views of the travel path of the movable member assembly 72*a* are shown as well in FIGS. 8A-8F. For instance, in a nonlimiting embodiment, the lower portion 84 is shown having two retaining features 85*a* and 85*b* which are disposed, extend into, and travel along or within corresponding slots 86*a* and 86*b* from the underside of the upper portion 82, respectively. The slots 86*a* and 86*b* guide the retaining features 85*a* and 85*b* in a direction of travel. Each slot is defined by a first wall 87*a* and a second wall 87*b*, the distance between which generally defines the travel path 88. The retaining features 85*a* and 85*b* serve to restrict the movement of the one or more portions (e.g., upper and lower portions) of the movable member assembly so that there is substantially little to no movement in a motion other than along the direction of travel. These features can align and keep the movable member assembly together by retaining the upper portion on the lower portion without the upper portion being too loose. The retaining features also assist in minimizing the potential rattling of one portion against the other in any stage.

At stage (A), the retaining features 85*a* and 85*b* of the upper portion are disposed at one end of the respective slots 86*a* and 86*b*, respectively. Preferably, each feature is disposed at a first wall 87*a* of the slots. At stage (B), as the upper portion 82 travels forward relative to the lower portion 84, the retaining features 85*a* and 85*b* are disposed in a central or middle section of the slots 86*a* and 86*b*, respectively. Further, at stage (C) as the upper portion 82 travels forward to its fully extended position, the retaining features

85*a* and 85*b* are disposed at the other end of the slots 86*a* and 86*b*, respectively where they cannot move any further as the slot wall 87*b* of each slot blocks further movement in the eject direction.

In one embodiment, the retaining features 85*a* and 85*b* comprise a hook like or undercut structure or may have any shape that assists in providing the retaining function. In one embodiment, the hook portion may protrude out from the underside of the upper portion and face towards an outer wall 89 of the movable member assembly. The term "under-cut" or "undercut structure" signifies a feature having a shape, which when utilized in the practice of molding a part (e.g., injection molding a plastic part), results in some interference with the mold (e.g., shape of part will not allow it to readily separate or fall free); for instance, upon the opening or removal of the mold after formation of the part.

While the retaining features 85*a* and 85*b* are described as disposed on the upper portion 82 and the slots 86*a* and 86*b* are described as disposed on the lower portion 84, these features and slots can be arranged in an alternative embodiment of the present invention where the features and slots are swapped, such that the retaining features are disposed on the lower portion and the slots are disposed on the upper portion. The present invention contemplates any feasible arrangement to provide retention along a travel path for the movable member assembly.

Turning to FIGS. 9A-9I, the interior of the eject button assembly 72*a* is depicted during stages (A), (B), and (C). Spring member 92 is a spring member of the present invention described herein and is disposed within a rail or track 94 on the underside 91 of the upper portion 82 as shown in FIGS. 9A-9I). In one embodiment, spring member 92 is fully encompassed within eject button assembly 72*a*. The track 94 preferably has the same general shape as the spring member such that the spring member can be accommodated easily. Thus, as shown in FIGS. 9A-9I, track 94 takes on a circular or loop shape to accommodate the loop shaped spring member.

Spring member 92 has a knob 92*a* and the track 94 or the underside 91 of the upper portion comprises one or more mounting structures 95 with a shape to accommodate the knob 92*a*. The shape of at least one of the structures 95 is desirably substantially curved or circular such that the curved profile of the retarding structure knob 92*a* can be disposed flush around a curved portion of the outer surface of the structure 95 as shown in FIGS. 9A-9I. The mounting structure 95 can serve to limit or control movement of the spring member 92. Other structures 95 present may generally provide a resting surface or wall.

Loop spring member 92 may or may not be permanently attached to the upper portion 82, the lower portion 84, or any other portion of the movable member assembly. Preferably, the spring member is not permanently secured, mounted or attached to any portion of the assembly such that it is lies on or within but is generally capable of moving within the circular track 94. For instance, if a portion containing the spring member were tipped upside down, the spring member 92 may desirably be loose or fall out of the lower portion relatively easily or be able to be lifted out of the track with one's fingers.

It should be noted that mounting structure 95 and the knob 92*a* of the spring member serve to retard or prevent the spring member 92 from spinning around and losing position within the track 94 which may negatively affect the functionality of the spring member 92. The mounting structure 95 is intended to keep the spring member in the same orientation throughout operation.

Turning to FIGS. 9A-9I, internal views of the upper and lower portions 82 and 84 showing underside surfaces 91*a* and 91*b*, respectively, of the movable member assembly 72*a* are shown including a top view of spring member 92, knob 92*a* as it is disposed within an upper portion 82 on the track 94. FIGS. 9A-9I depicts how the spring member changes within the eject button during the stages of ejection when a force is exerted. While spring member 92 is disposed in a portion (e.g., track) of an upper portion 82 of the eject button assembly 72*a*, the present invention contemplates that the spring member 92 may also be disposed in the lower portion 84 or if the upper and lower portion are integrated then the spring may be disposed within an upper portion and a lower portion of the eject button assembly 72*a*. As shown, the spring member 92 is disposed within the upper portion 82 but contacts the lower portion (e.g., as depicted in FIGS. 9A-9I on surface 91*b*). The lower portion may have any number of pieces. Thus, either an upper, lower, or any or all portions thereof of the movable member assembly may desirably include a track, rails, or other structural features, within which the spring member 92 is contained and moves within. It is further contemplated in the present invention that the lower portion comprise a movable member and the upper portion be fixed relative to the handle. Extending from surface 91*b* of the lower portion 84 are two guide support structures 93 provided along the outer periphery of spring member 92 or track 94 (shown in FIGS. 9A-9I).

The additional guide support structures 93 are desirably disposed proximal to the overlapping portion 97 of the end portions 96*a* and 96*b* and distal ends 96*a*' and 96*b*' respectively. In this way, the support structures 93 serve to keep the loop spring or its end portions from extending outward from the track or from losing shape or orientation.

As noted above, the spring member 92 is desirably not permanently fixed within lower portion as discussed above. The spring member 92 of the present invention is preferably in a preloaded, slightly compressed position at stage (A) of FIG. 9. This state is considered a neutral or at rest position such as when a razor is fully formed or assembled and/or ready for use. As depicted, spring member 92 has a generally circular shape at stage (A).

Also contemplated in the present invention is a spring member 92 in any other feasible position in the rest state, (e.g., not in a preloaded, compressed position). The pre-loaded, tension arrangement provides a further advantage in that it assists in eliminating rattling or other noises that may be present in a fully assembled razor. With a spring member not under tension, the spring member may be moving around (e.g., due to the fact it is not permanently attached to the eject button portions). The overlapping portion 97 of the end portions 96*a* and 96*b* and distal ends 96*a*' and 96*b*' of the spring member 92 may be analogous any of the overlapping end portion arrangements described herein. The distal ends 96*a*' and 96*b*' are desirably not fixed to any structure in the movable member assembly, are generally unsupported, and can be free ends.

A spring member inside the eject button under a force F is shown at stage (B) and stage (C). At stage (B) the spring member 92 is initially compressed from its original rest state as a linear force F is applied. The end portions 96*a* and 96*b* and free distal ends 96*a*' and 96*b*' of the spring member 92 move down and around, along the outer and inner periphery of the spring member 92. In one embodiment, the overlapping end portion 96*b* that was initially disposed outside the periphery of the spring member 92 moves down along the outer periphery of the spring member 92 as shown in stage (B) at surface 91*b* of FIG. 9 while the other end portion 96*a* that was internal to the periphery moves along the inside of the spring member 92 as it is compressed.

At stage (C), as additional force F is applied, the button is in its fully extended position as described in conjunction with FIG. 8. At stage (C), the spring member 92 (which is shown from both upper and lower portion vantage points) is formed or compressed into an elongated or flattened oval shape. In contrast, when stretched out or in the rest position at stage (A), the spring member has a more circular shape.

FIG. 9 depicts the structure of the spring members in stages (A), (B), and (C). As spring member 92 is compressed during the linear movement forward, the extent of the overlapping portion 97 of spring member 92 is increased, as can be seen in the difference in the overlapping portion size from that of the neutral or rest state at stage (A) in FIG. 9 to the further compressed state at stage (C) of FIG. 9. In one embodiment, the size of the overlapping portion 97 of spring member 92 substantially doubles as the eject button is moved linearly forward. In an embodiment the end portions and distal ends move far enough along the left and right sides of the spring member 92 to approach the knob 92*a* of the spring member 92.

Figure 9B:
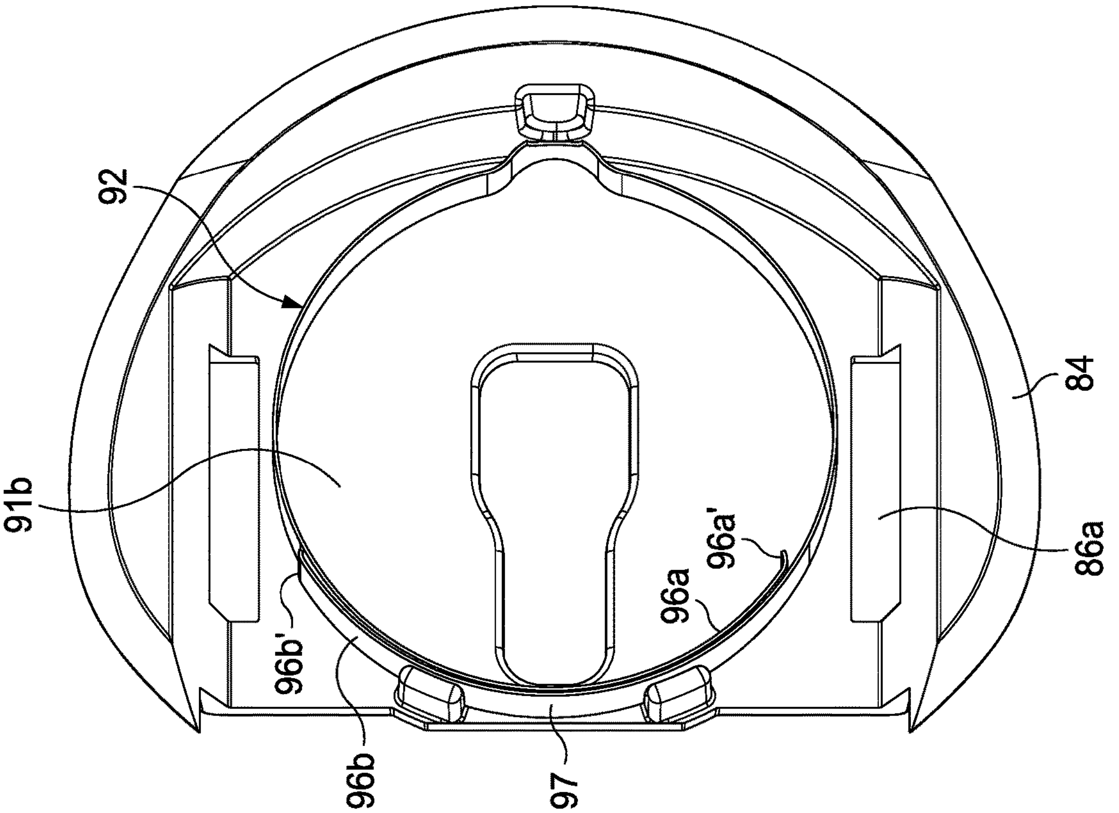
FIG. 9A-9F depicts stages of a movable member assembly of the present invention.
Figure 9A:
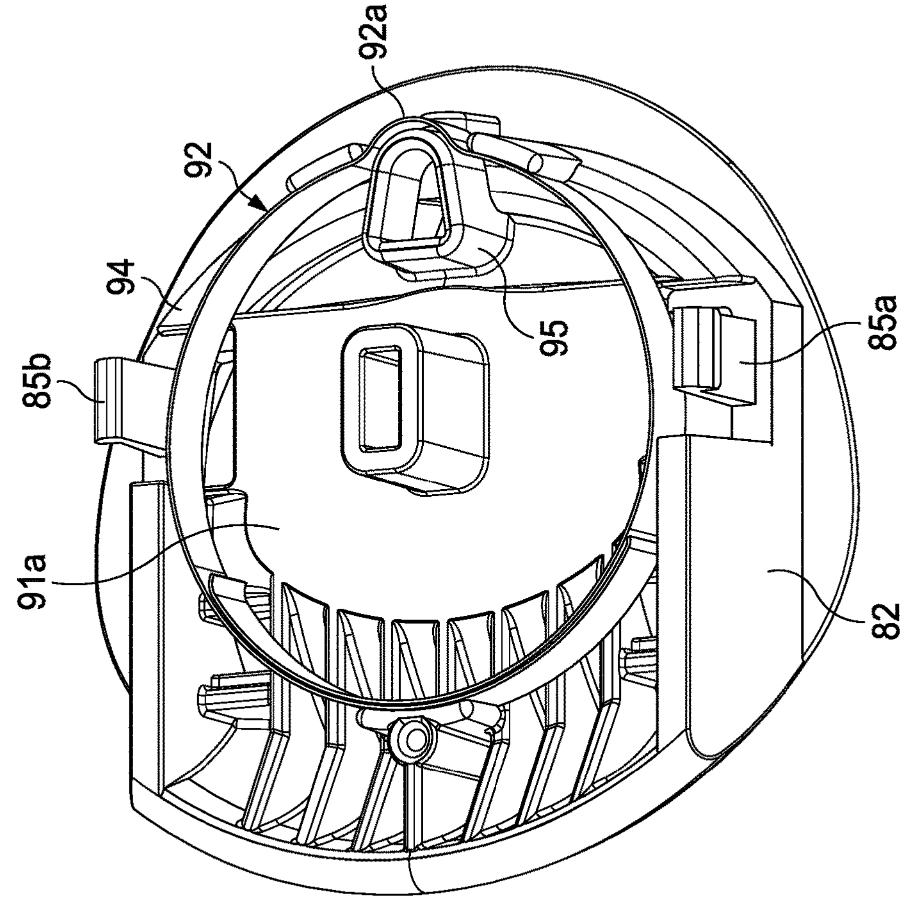
Figure 9D:
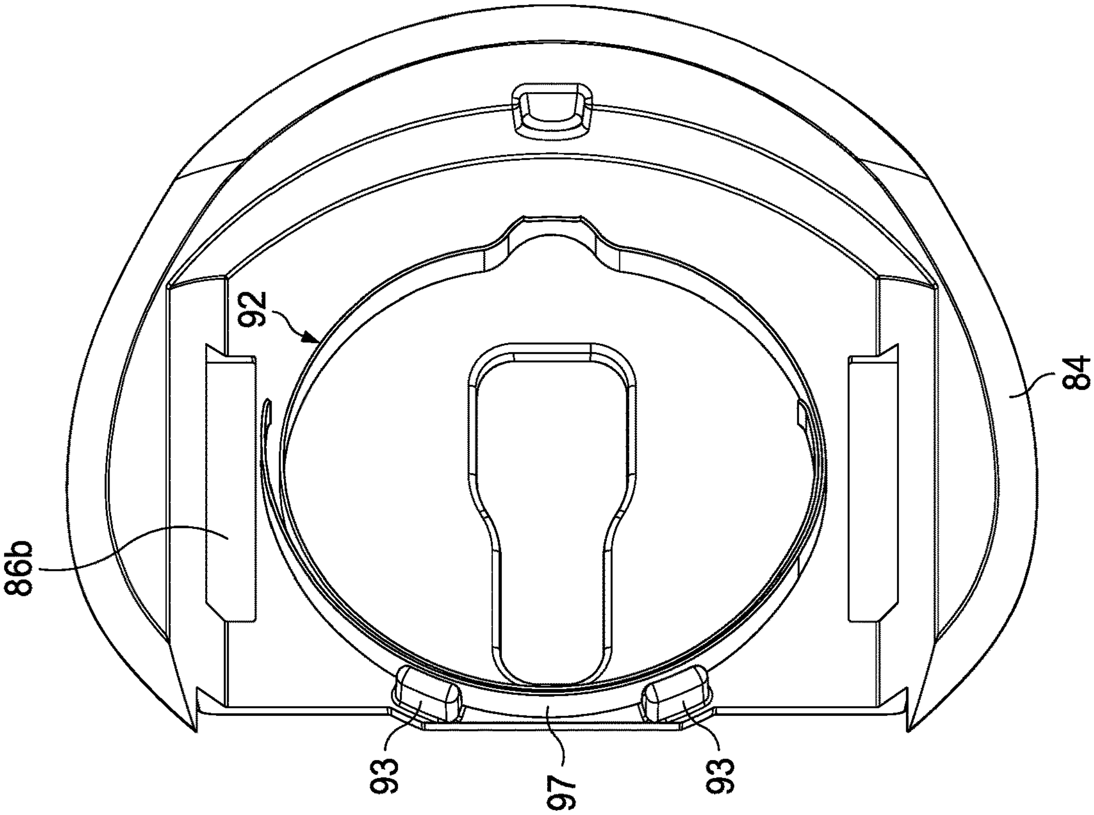
Figure 9C:
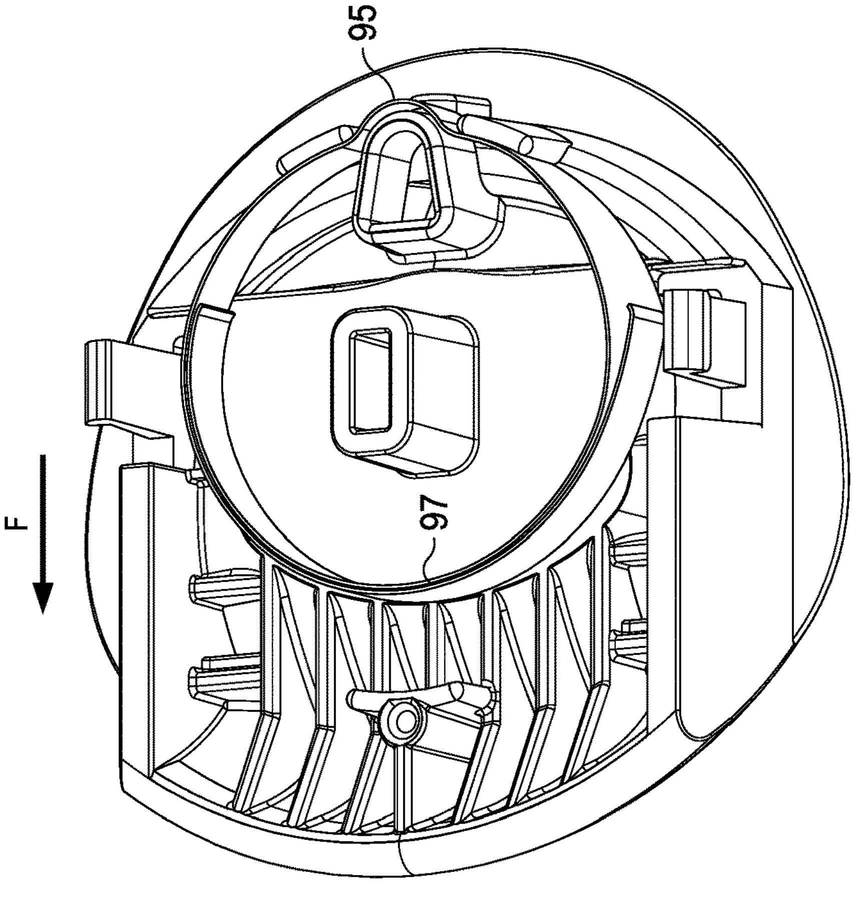
Figure 9F:
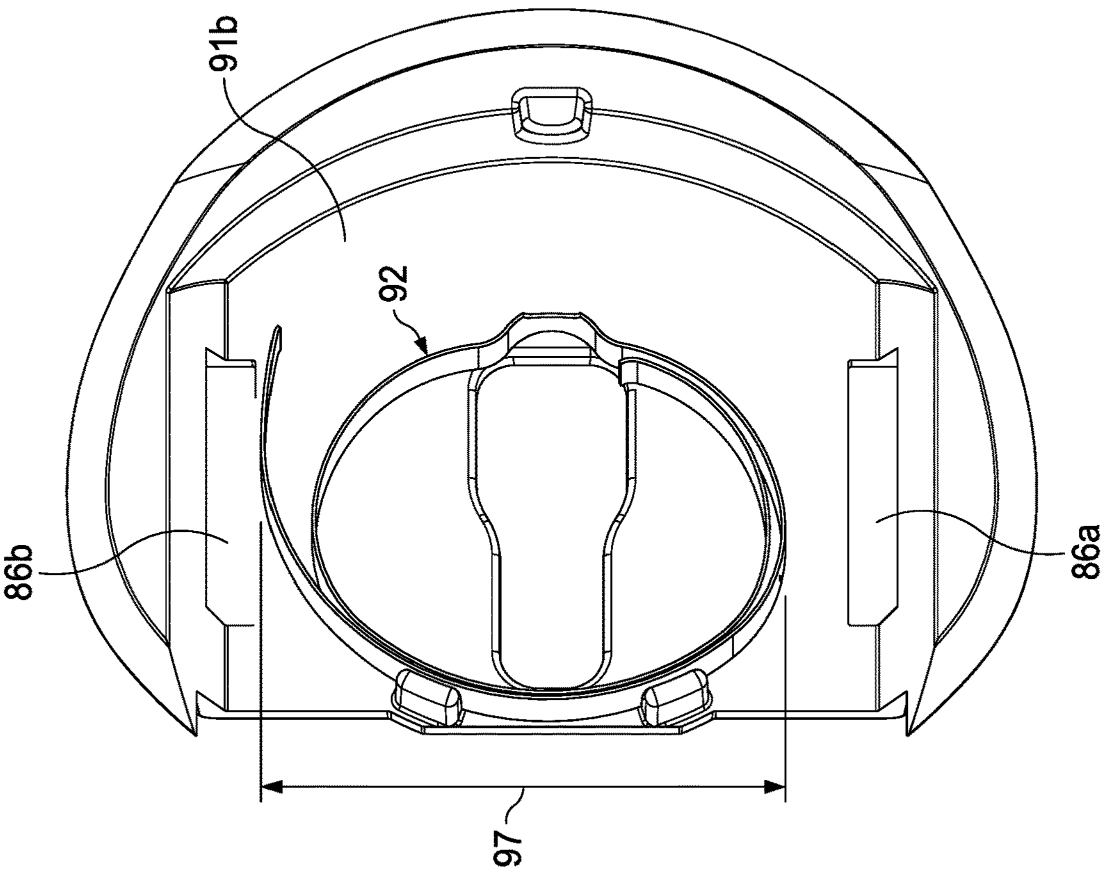
Figure 9E:
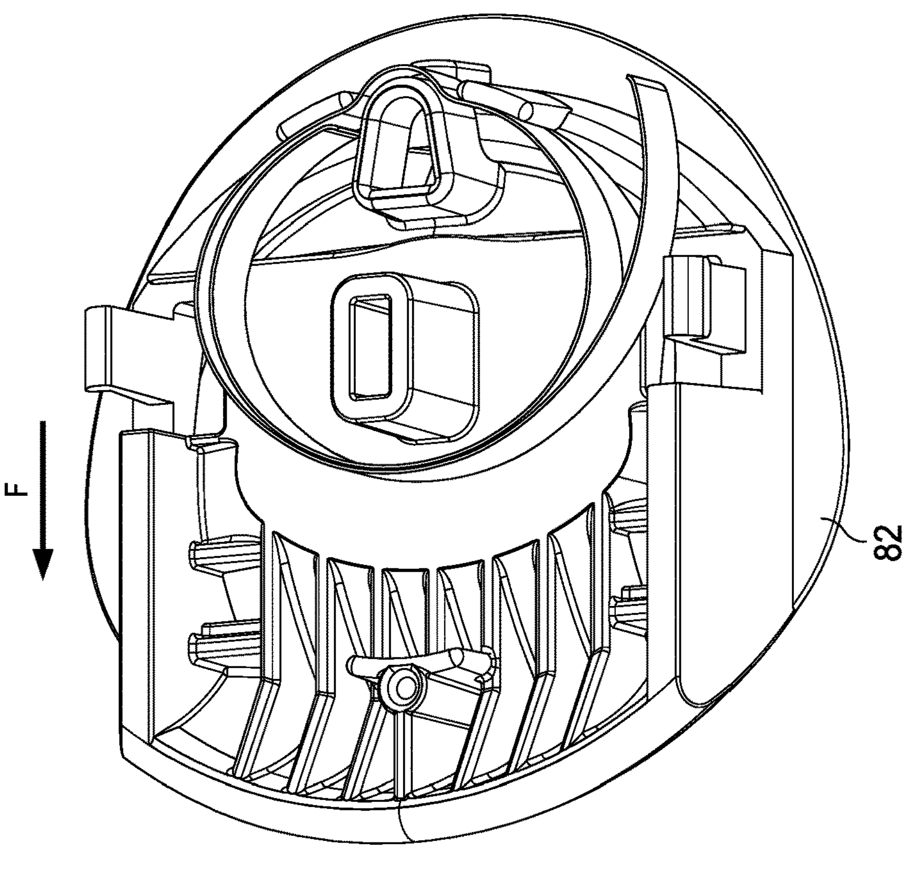

A width or height 99 of the spring member 92 is also shown in FIG. 9A. Desirably, the height 96 of the spring member of the present invention ranges from about 1.00 mm to about 4 mm, and preferably about 1.7 mm. In a non-limiting preferred embodiment of the invention, the height 99 of the spring member is uniform throughout the loop. The thickness 98 of the spring member 92 is about 0.1 mm.

The direction of the force F is shown in FIGS. 8A-8F and 9A-9F by the arrows F. In one embodiment of the present invention, the force F that the eject assembly undergoes to release a cartridge from a handle is about 5 Newtons. A travel distance comprises a linear movement forward or backwards along a longitudinal axis. In one embodiment, the travel distance can be about 5 mm in the direction of the force. A force per unit travel of the travel distance without ejecting the cartridge can be from about 0.3 Newtons per mm to about 1 Newtons per mm and preferably about 0.7 Newtons per mm. Higher forces per unit travel may ensure that the eject button assembly can robustly return to its original position while lower forces per return can provide consumer acceptable operation while ejecting the cartridge (e.g. large fraction of force can be dedicated to cartridge eject versus overcoming eject button spring). Additionally, in another embodiment, the present invention contemplates that the eject button assembly 72*a* can travel in a backwards direction from the rest position at stage (A). The eject button assembly may travel in a direction opposite the forward direction (e.g., the direction to release a cartridge) if the razor is accidentally dropped and the button assembly is unavoidably forcibly pushed rearward. Under a drop situation, the force may be about 20N in the drop direction and it may be about 10 N for a user to get back into the position of stage (A).

Turning to FIG. 10, the button assembly or a portion thereof, can travel about 2 to 2.5 mm backwards as shown from the initial rest position at stage (A), to intermediate stage (D) and to final stage (E). The direction of force F is shown by the arrow in FIGS. 10A-10C. Stage (D) represents the assembly having moved midway of the backward travel path of about 1.5 mm while Stage (E) represents the button fully extended in the opposite travel direction of eject (e.g., about 2.5 mm back toward the handle). A stop 110 may be included in the button assembly to preload the spring and prevent the button assembly inclusive of the spring from rattling in the rest position. Additionally, the stop 110 may serve to dampen or mitigate any damage to the button assembly, as it may function as a bumper or stop along the backwards travel path in the event of an accidental drop.

Figure 10A:
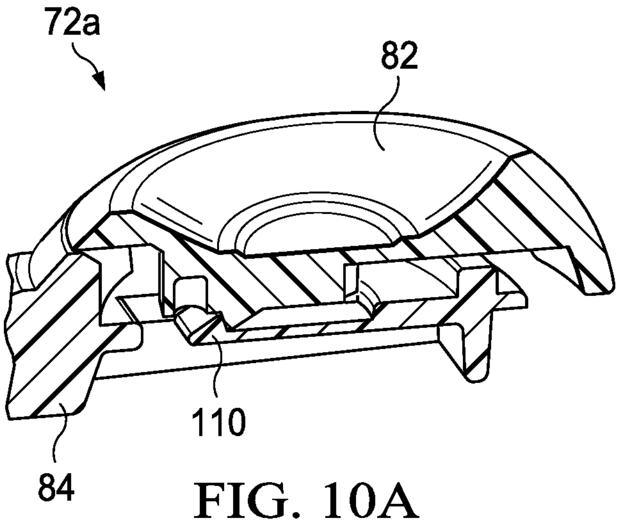
FIG. 10A-10C depicts stages of a movable member assembly in a backwards direction of the present invention.
Figure 10B:
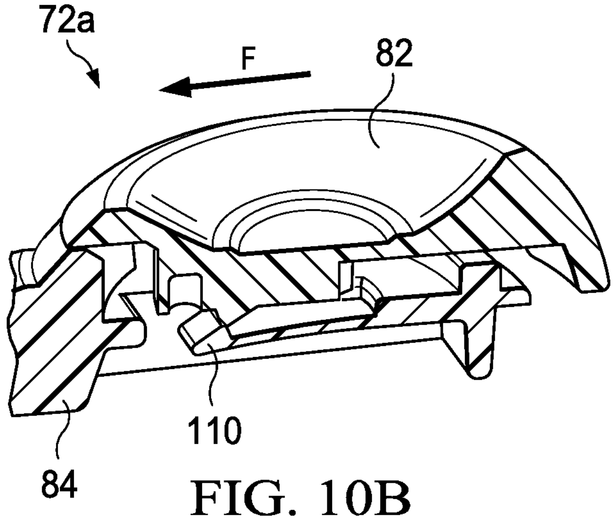
Figure 10C:
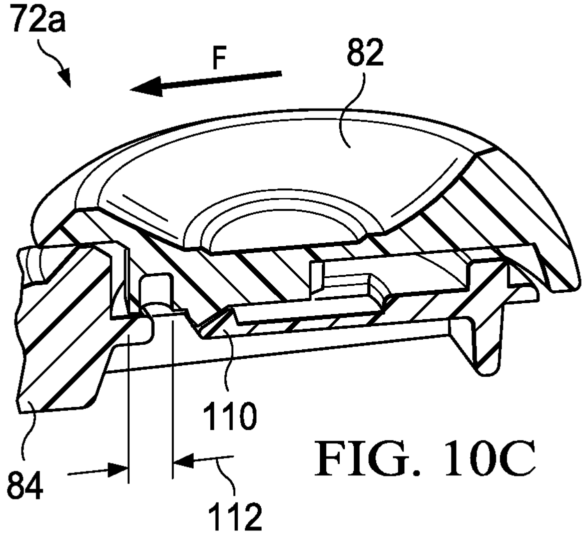
Figure 10F:
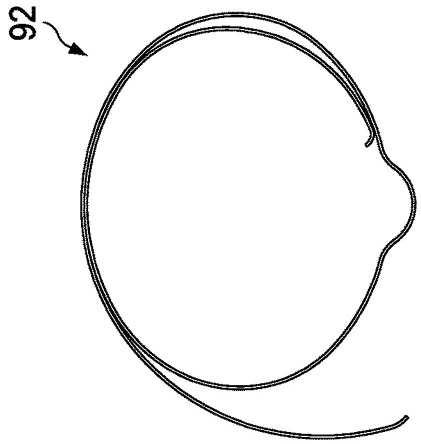
FIG. 10D-10H depicts loop shaped spring members of FIGS. 8-10.
Figure 10E:
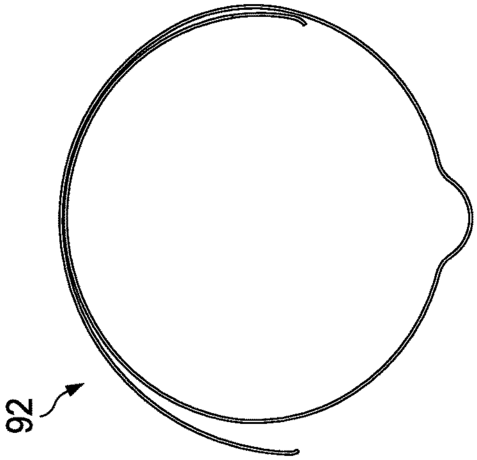
Figure 10D:
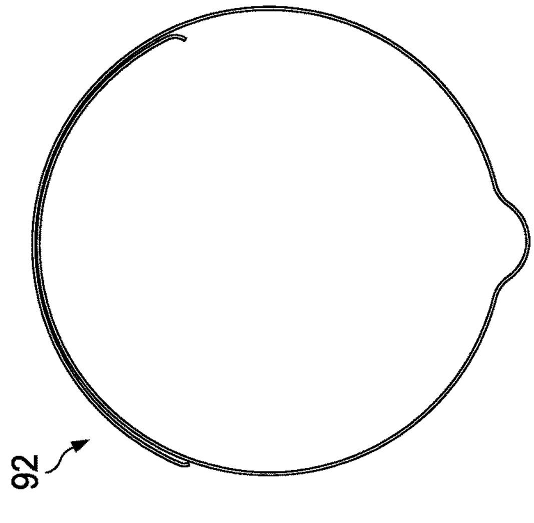
Figure 10H:
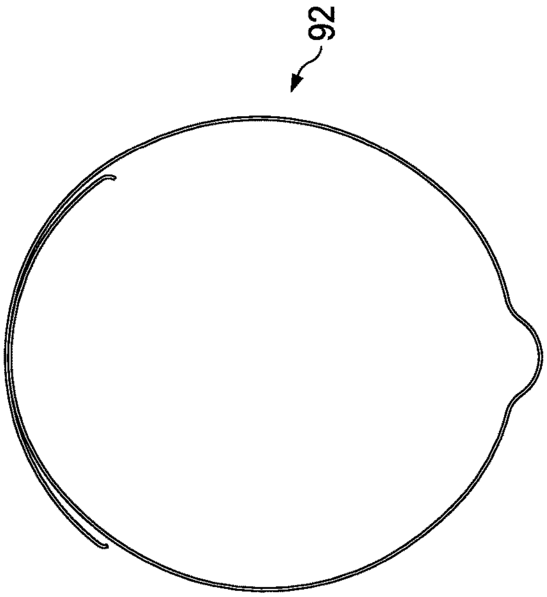
Figure 10G:
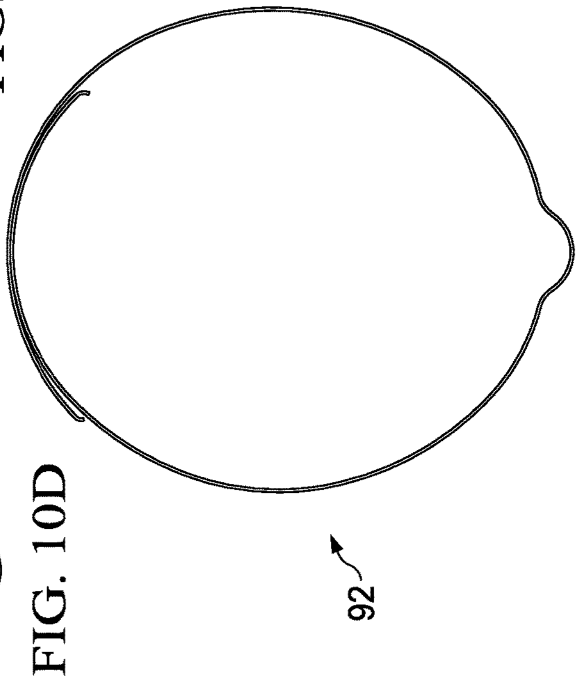

In one embodiment, the stop 110 may provide a compression preload force which is about 0.25 Newtons to about 0.75 Newtons, and preferably about 0.32 Newtons while also preventing the button from traveling backwards. To travel backwards, the button can travel over the side of stop 110 with a steep slope and the force to overcome the stop is about 20 Newtons. This allows the button to move out of the way during accidental drops without causing damage. The side of the stop 110 with a gradual slope provides a low enough force of about 10 Newtons to allow the consumer to put the button back in the rest position. In this way, the button does not get stuck or damaged. It should be noted that while at stage (A), the spring member 92 is the same as described with respect to cartridge ejection, during the backwards movement of the assembly, the spring member 92 will become larger or elongate and the overlapping portion will be reduced as shown in FIG. 10A, first at intermediate stage (D), then more so at final stage (E) as compared to the spring member at stages (B) and (C) as shown in FIG. 10A.

Figure 11A:
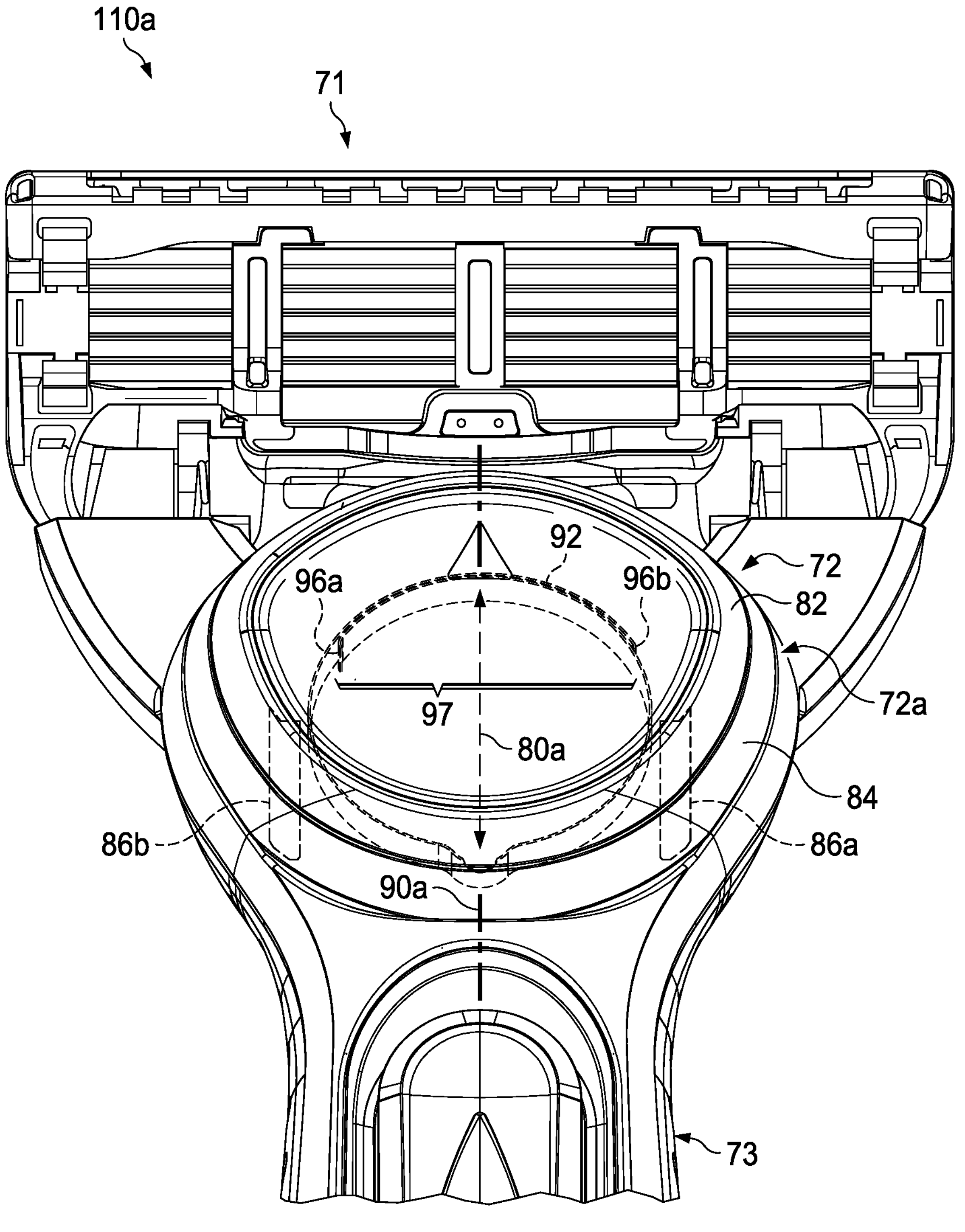
FIG. 11A is a schematic semi-transparent top view of a razor portion having a first movable member assembly depicting an eject button assembly with a spring member in accordance with the present invention.
Figure 11B:
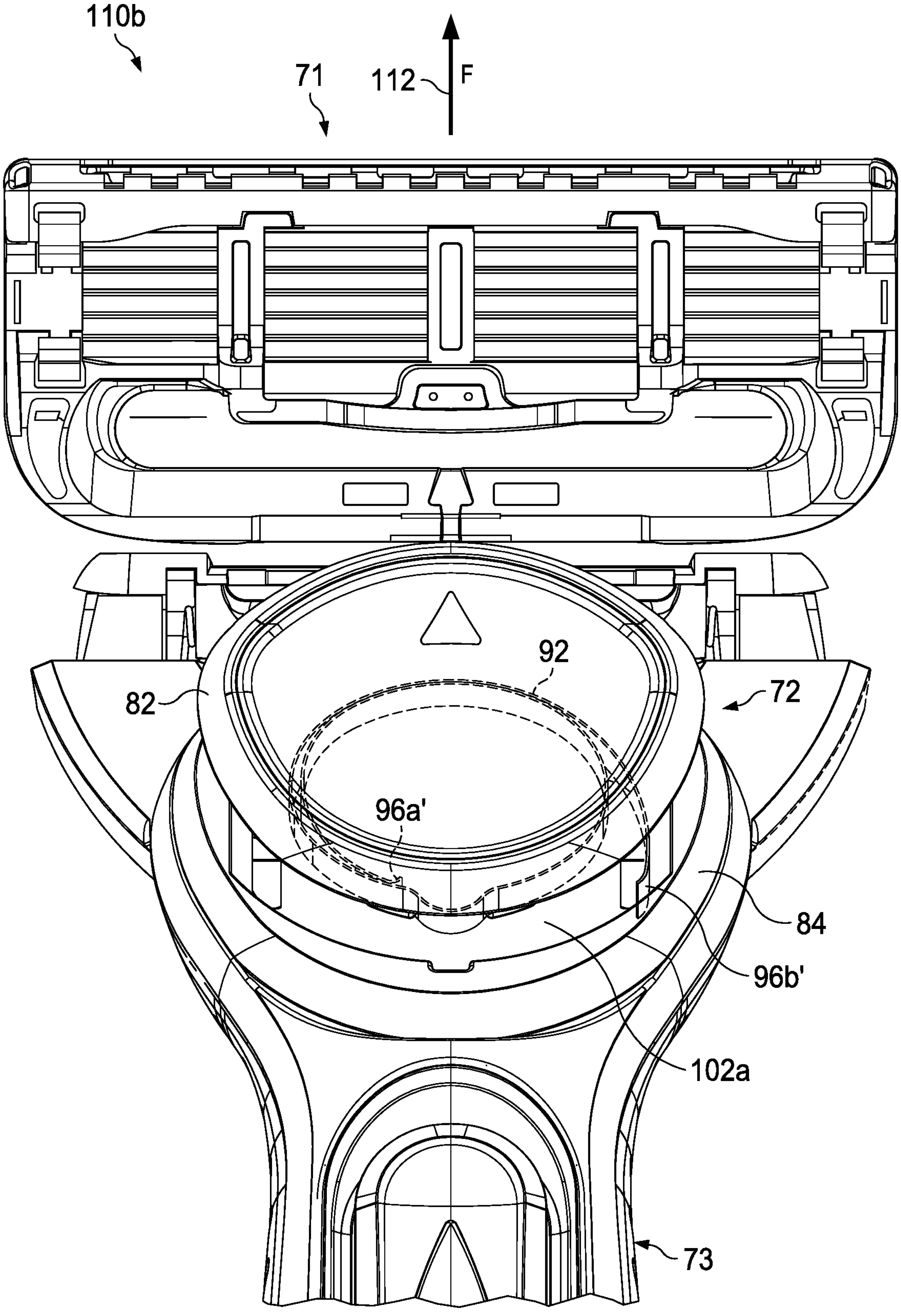
FIG. 11B is a schematic semi-transparent top view of a razor portion having a first movable member assembly depicting an eject button assembly with a spring member under force in accordance with the present invention.
Figure 11C:
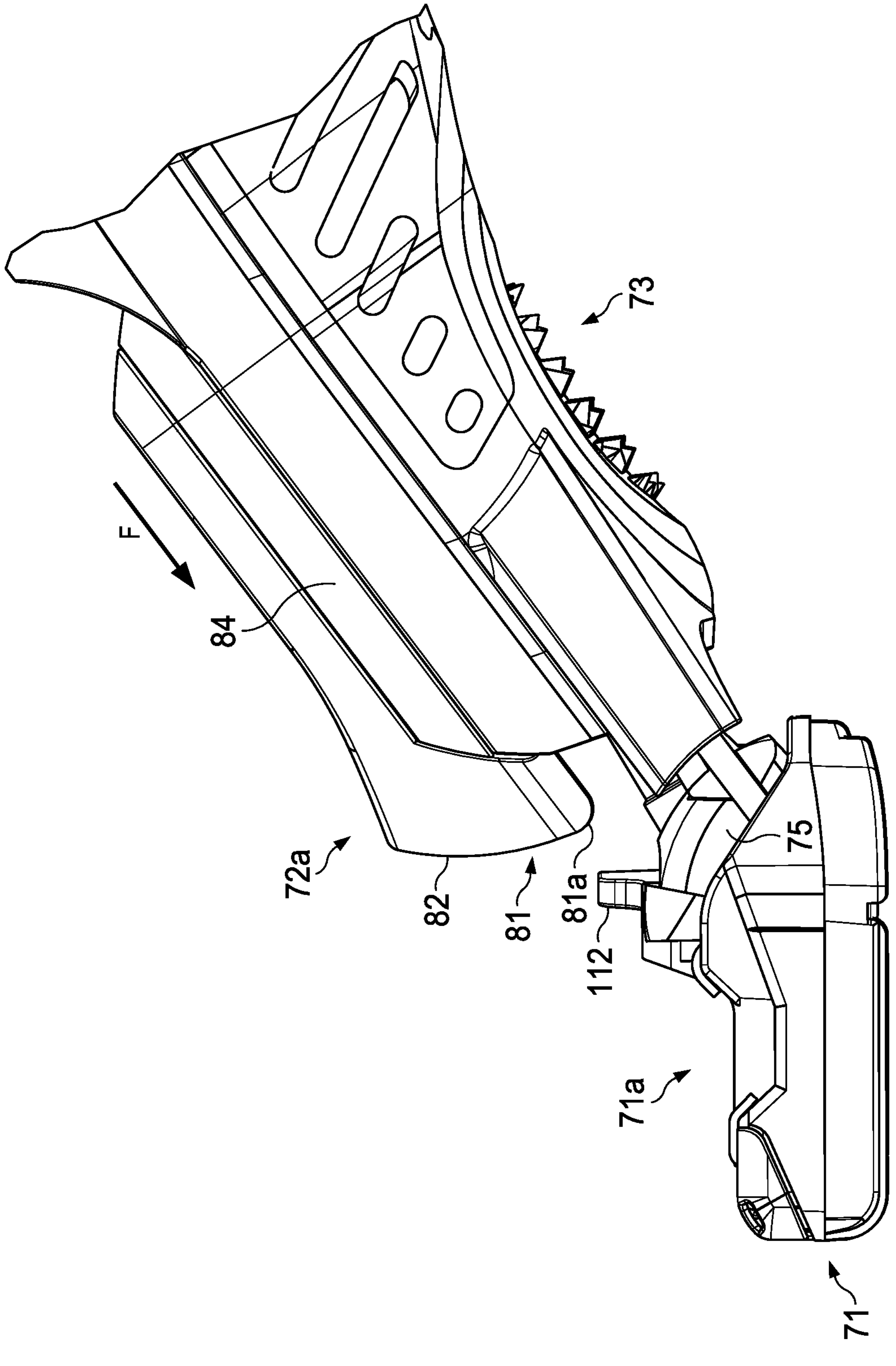
FIG. 11C is a side view of the eject button movable member assembly relative to a razor cartridge in accordance with the present invention.

Turning to FIG. 11A, a schematic semi-transparent top view of a razor 110*b* is shown having an eject button assembly 72 with a spring member 92 disposed therein. The spring member 92 may be a part of the razor cartridge 71 or a part of the razor handle 73 or both. As depicted in FIG. 11A, the eject button 72 is disposed as part of the proximal end of a razor handle 73.

Figure 9G:
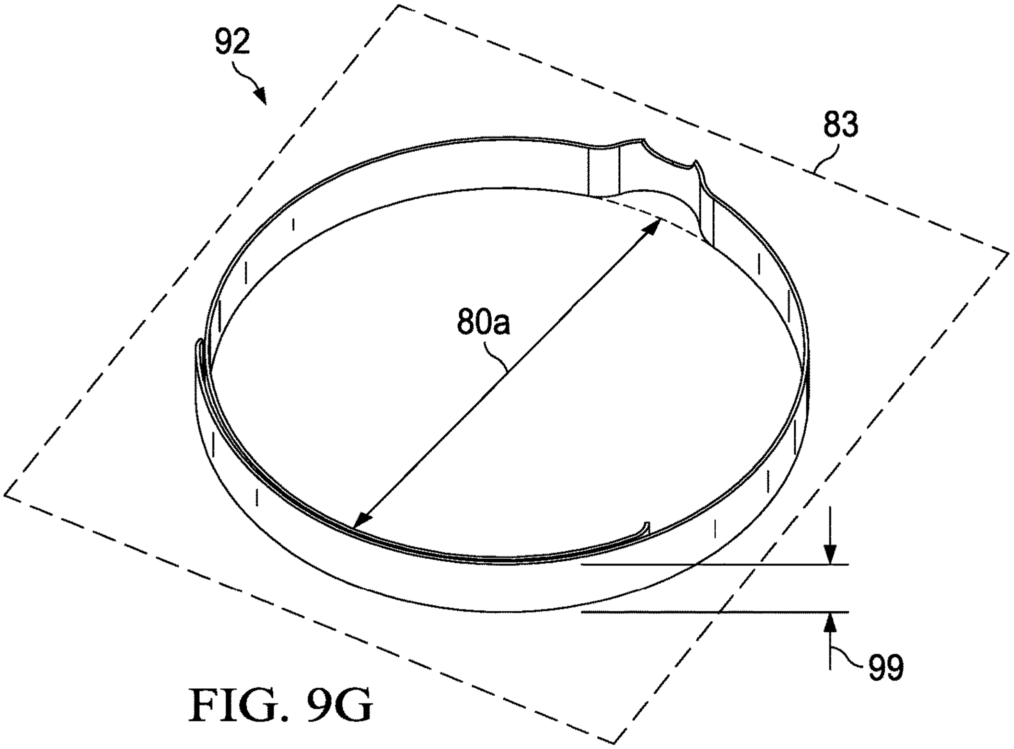
FIG. 9G-9I depicts loop shaped spring members of FIGS. 8 and 9.
Figure 9H:
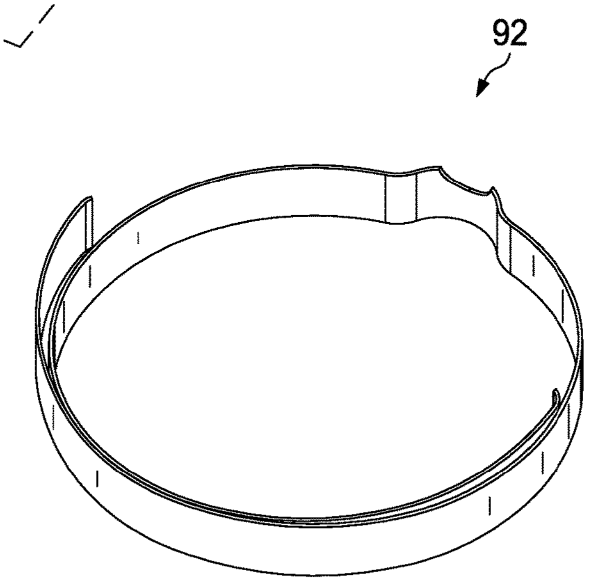
Figure 9I:
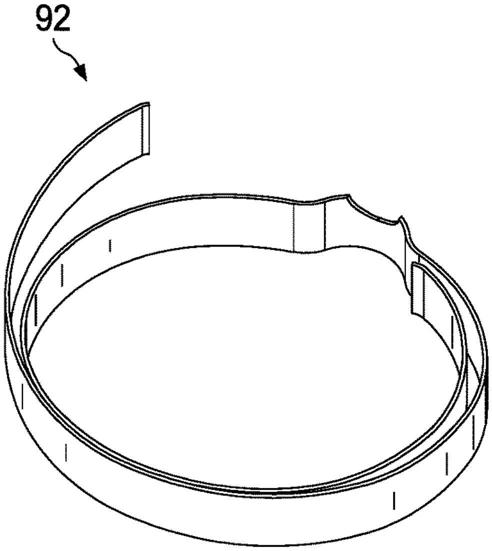

Spring member 92 is shown disposed in the eject button assembly 72*a*. As shown in FIGS. 9G and 11A, the spring member 92 includes a diameter 80*a* that extends in a plane 83 parallel to a longitudinal axis 90*a* of the eject button assembly 72*a*. The tracks 94 may be disposed within an upper portion 82 and/or a lower portion 84 of the movable member assembly or the eject button 72. As shown, the spring member 92 is disposed within the upper portion 82 but contacts the lower portion 84 as well.

Turning to FIG. 11B, a schematic semi-transparent view of a razor 110*b* is shown having eject button assembly 72 of FIG. 11A (with spring member 92) under a force F is shown. In the ejection mechanism of the present invention, the force F as shown by the arrow in FIG. 11B is preferably the linear movement forward or the force when the eject button is pushed forward (e.g., typically with a user's finger). The linear movement forward has the effect of pushing the upper portion 82 into the rear of the cartridge 71 as shown in FIG. 11B thereby removing or separating the cartridge 71 from the handle 73. As the force is applied, in one embodiment of the invention, the upper portion 82 of the assembly 72 moves along the tracks 86*a* and 86*b* and the spring member 92 is further compressed from its original state (e.g., stage (A)). The end portions 96*a* and 96*b* and distal ends 96*a*' and 96*b*' of the spring member 92 move down along the inner and outer periphery, respectively of the spring member 92 as shown in FIG. 11A and as described and shown with regards to FIG. 9 (e.g., at stage (C)).

As noted above, a spring member of the present invention may assist in the operation of the pivot functionality. The spring member may be disposed within a pivot member which can have one or more movable members. The pivot functionality may pivot the razor cartridge relative to the handle along a number of axes in the pitch, yaw or roll motions. A razor contemplated in the present invention is described in U.S. Docket Nos. 62/650,291, 62/650,292, 62/650,293, 62/650,294, 62/650,932, 62/650,938, 62/650,961, and 62/650,964 which are hereby incorporated herein by reference.

Figure 12A:
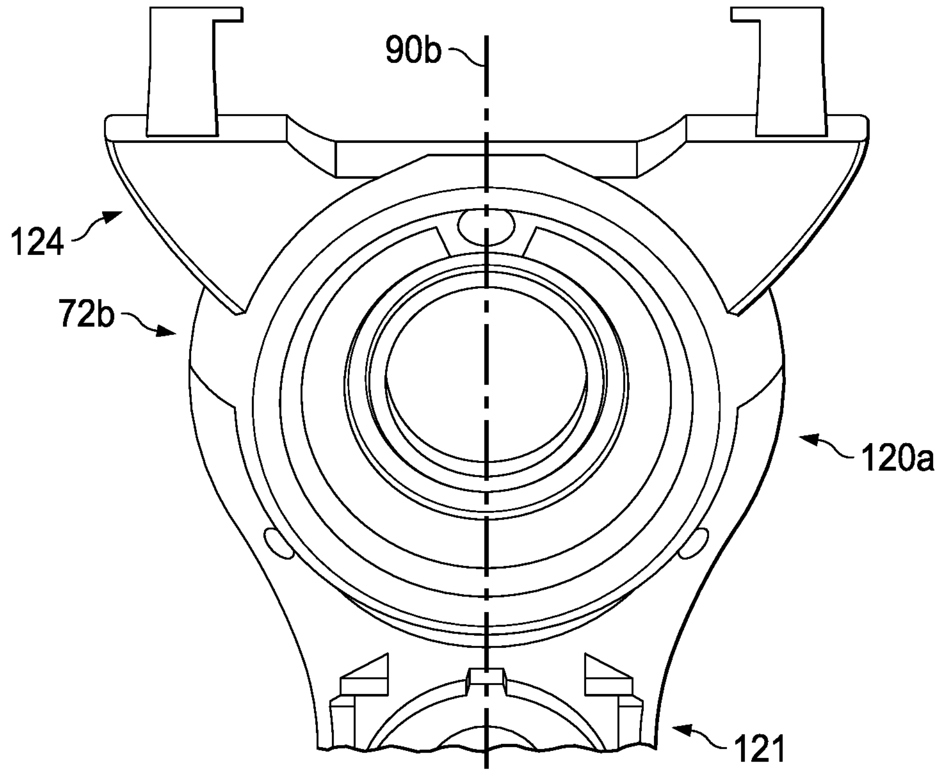
FIG. 12A-12D depicts schematic views of a second movable member assembly having a pivot functionality with a spring member in accordance with the present invention.
Figure 12B:
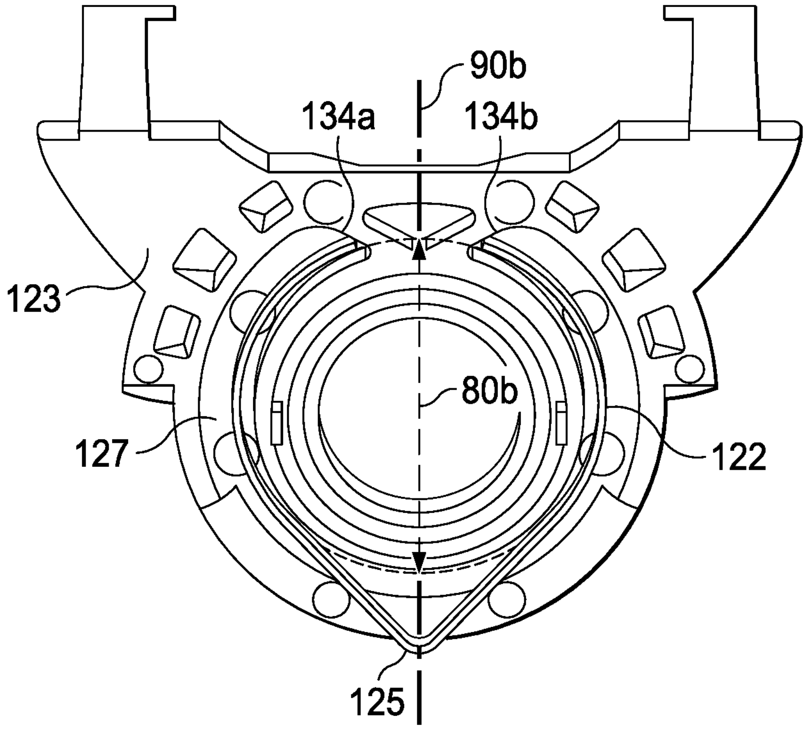
Figure 12C:
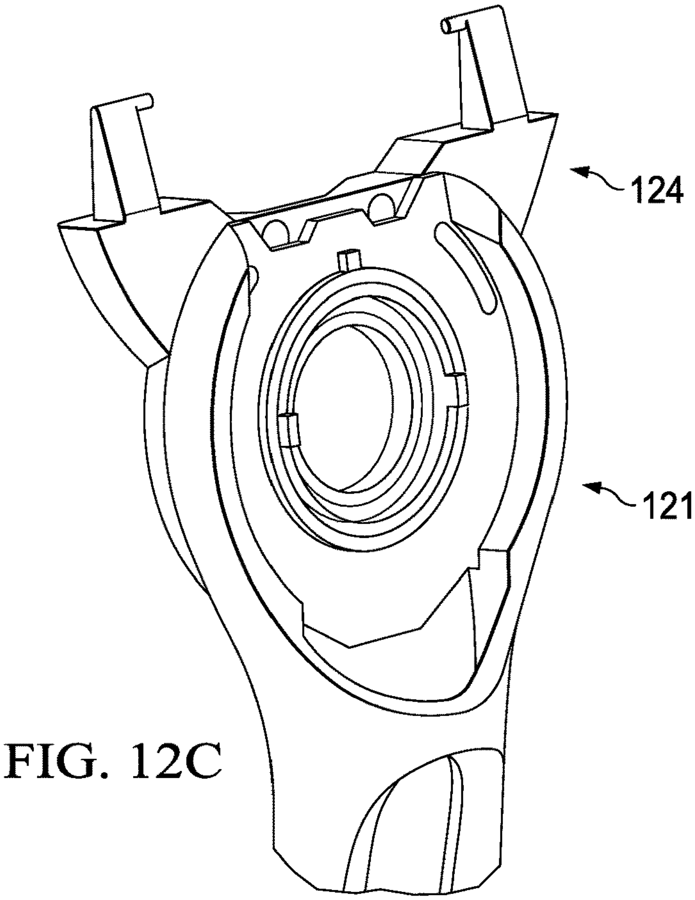
Figure 12D:
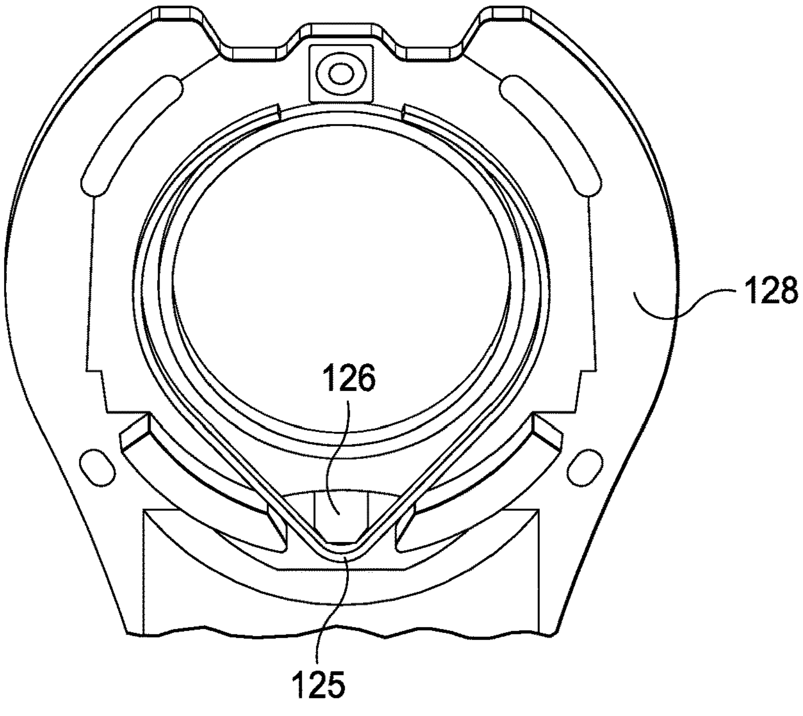

An exemplary second movable member assembly 72*b* of the present invention is shown in FIG. 12A. The exemplary assembly 72*b* can be disposed as shown in the bottom view of the razor in FIG. 7B. The second movable member assembly 72*b* is comprised of a pivot member 124 and is joined to a portion of the handle 121 such as the main body or frame of the handle as shown in FIG. 12 view (A). FIG. 12, view B depicts a tear drop shaped loop spring member 122 of the present invention (e.g., FIG. 3) disposed in the pivot member 124. Spring member 122 can be mounted to the handle frame 121 or to an underside surface 123 of the pivot member 124. As shown in FIGS. 12A and 12B, the spring member 122 includes a diameter 80*b* that extends in a plane (not visible; see reference numeral 83 in FIG. 9G) parallel to a longitudinal axis 90*b* of the second movable member assembly 72*b*. Spring member 122 will sit and move relatively freely within a track 127 on the underside surface 123 of the pivot member 124 as shown in FIG. 12 view (B). Distal ends of the spring member 122 will contact stop walls 134*a* and 134*b* of the track. In one embodiment, assembly 120*a* is in a neutral or rest position as shown in FIG. 12(A). In one embodiment, spring member 122 is fully encompassed within pivot member 124 (e.g., disposed entirely internal to assembly 72*b*). Pivot member 124 may comprise one or more portions. As shown in FIG. 12, view (C), the handle frame 121 is joined to the pivot member 124. In FIG. 12, view (D), spring member 122 of the present invention is mounted to the inner surface 128 of the frame 121 such that the knob or notch 125 of the spring member 122 is disposed around one or more protuberances 126 on the inner surface 128 of the handle frame 121. Inner surface 128 and underside surface 123 of FIG. 12 views (B) and (D) will mate and sandwich together with the spring member 122 inside to mount the pivot member to the handle shown in FIG. 12 views (A) and (D). This assembly will provide rotational pivot functionality for the razor.

Figure 7B:
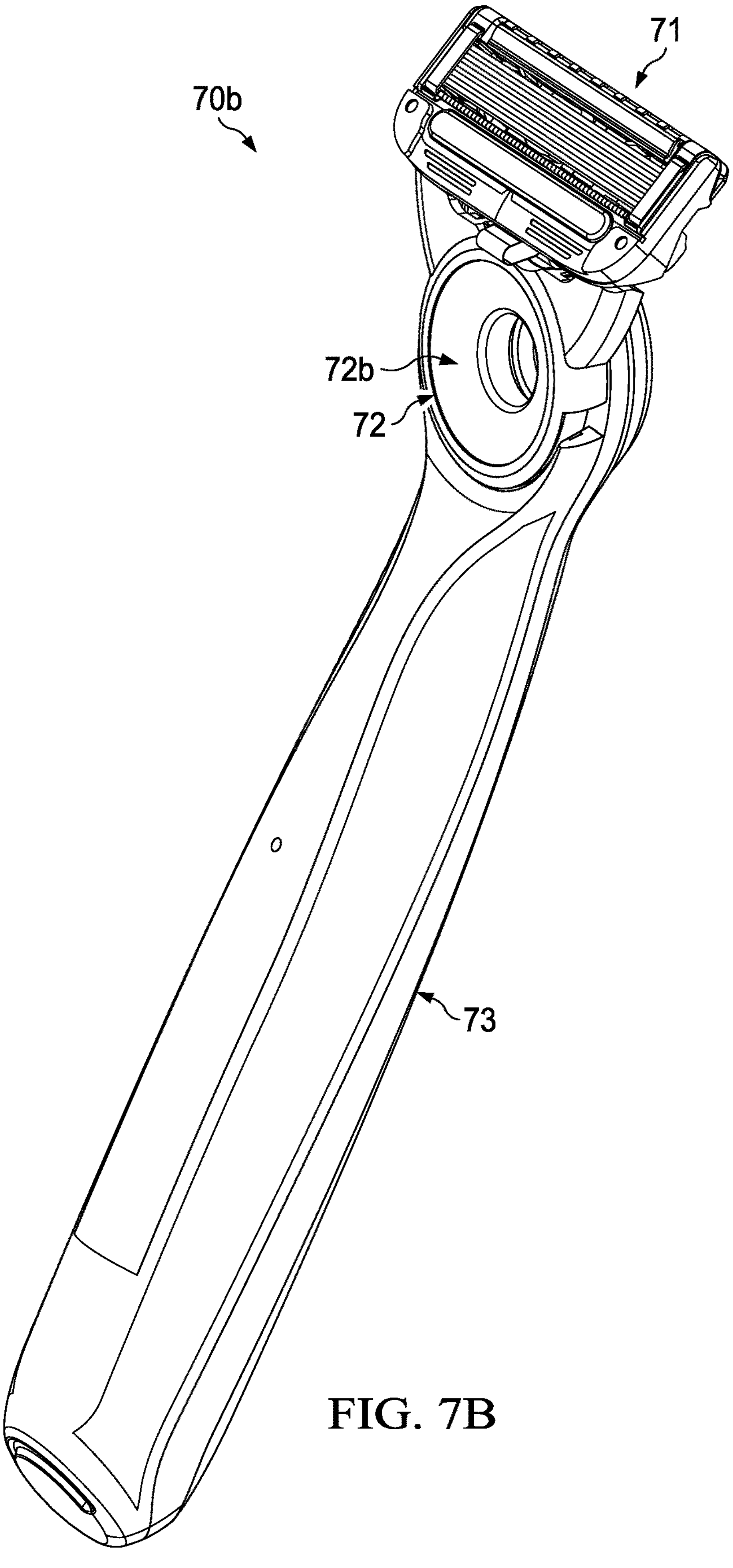
Figure 7C:
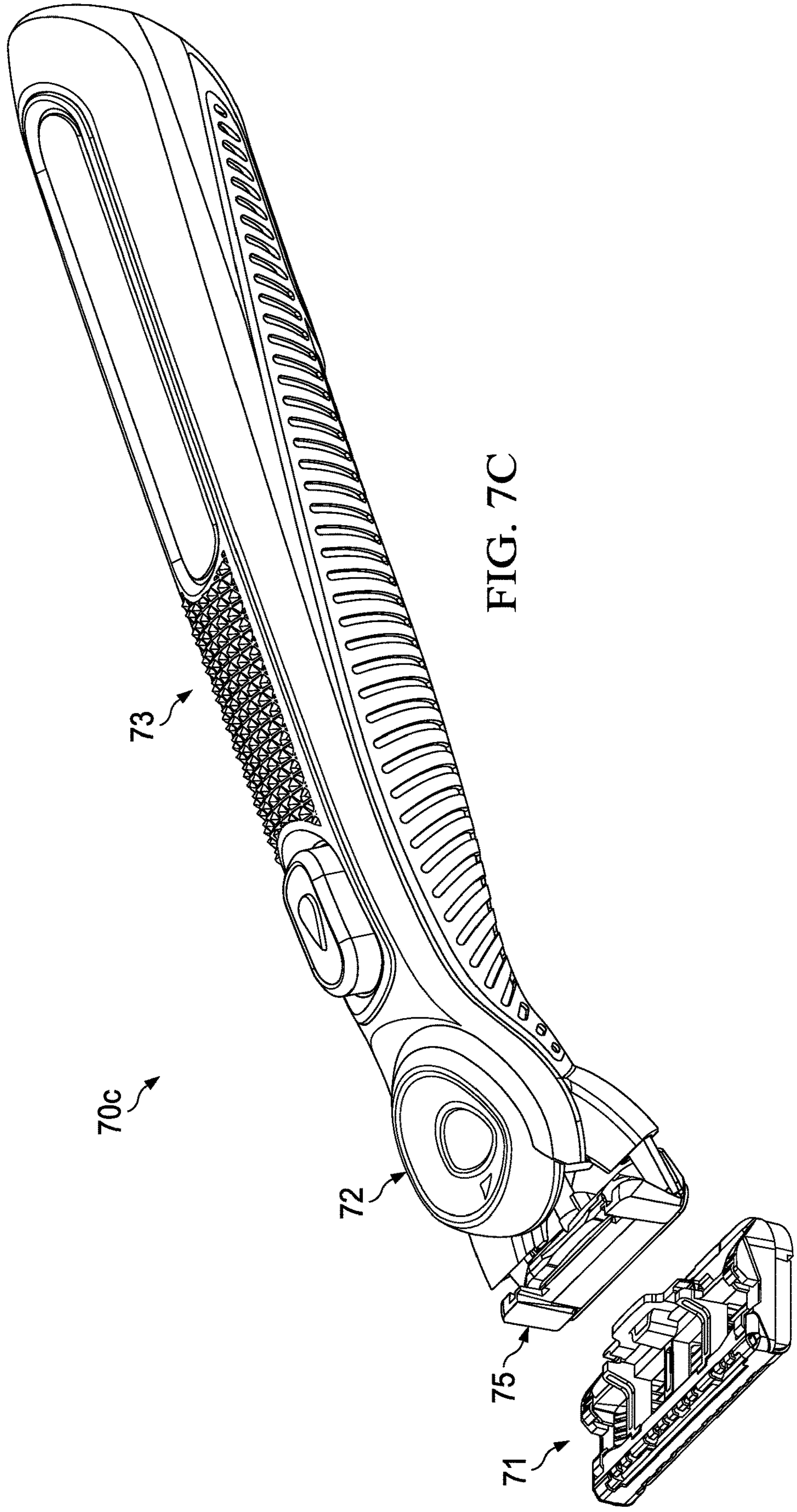
Figure 8A:
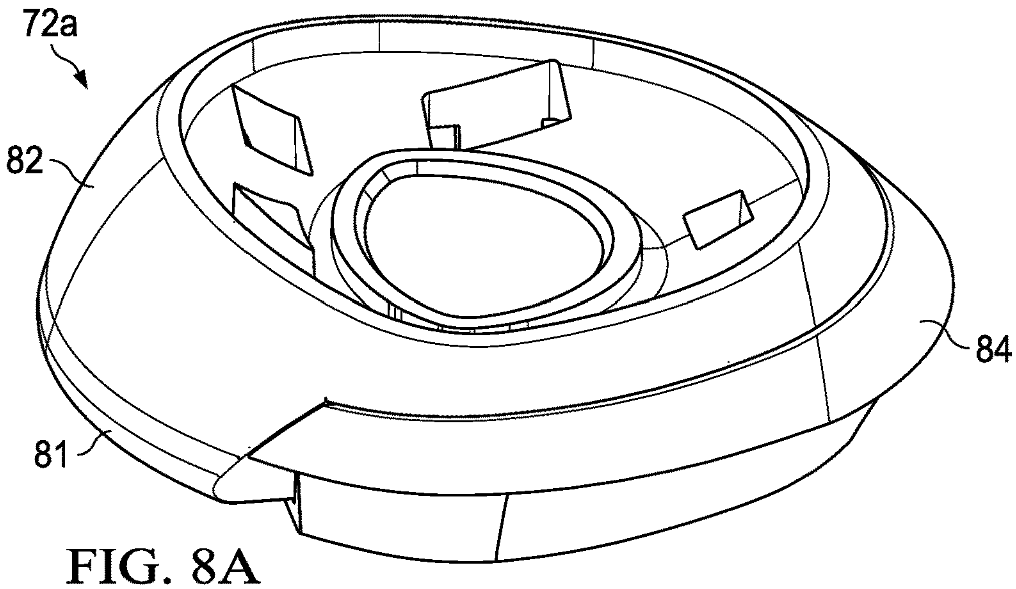
FIG. 8A-8F depicts stages of a movable member assembly of the present invention.
Figure 8B:
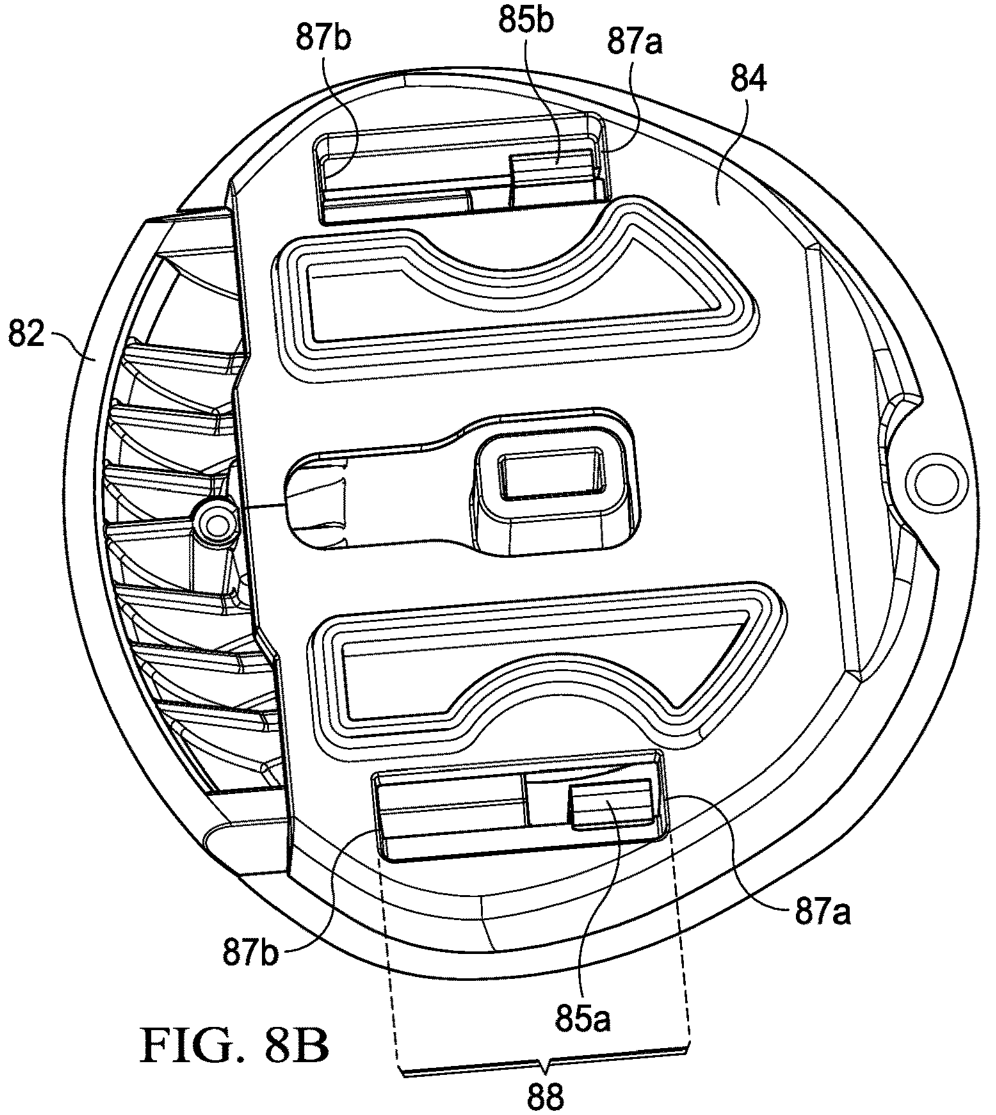
Figure 8C:
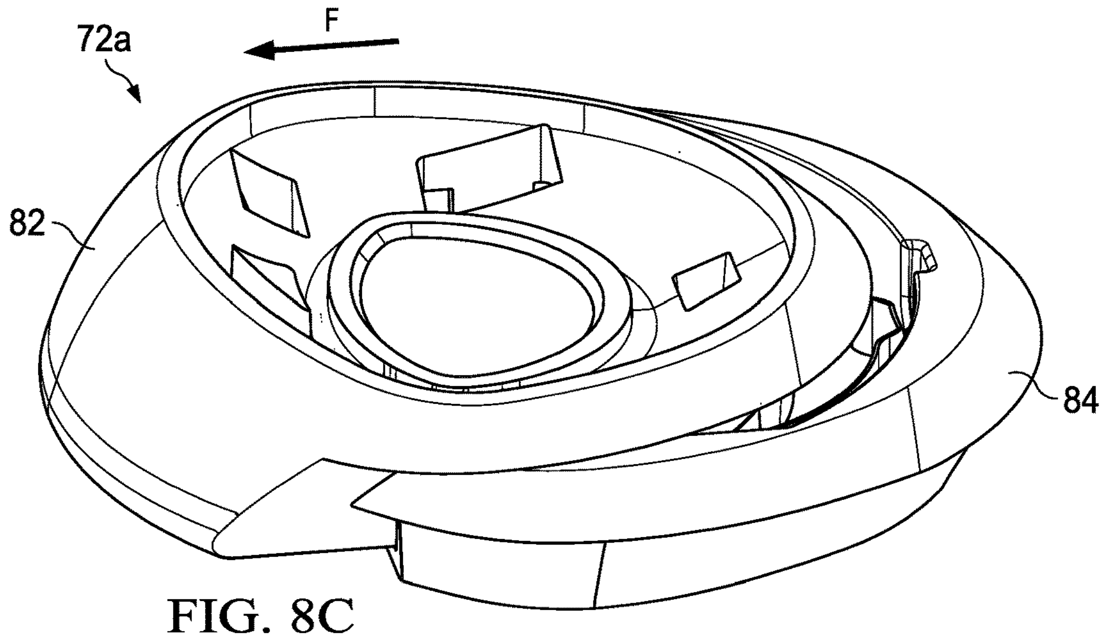
Figure 8D:
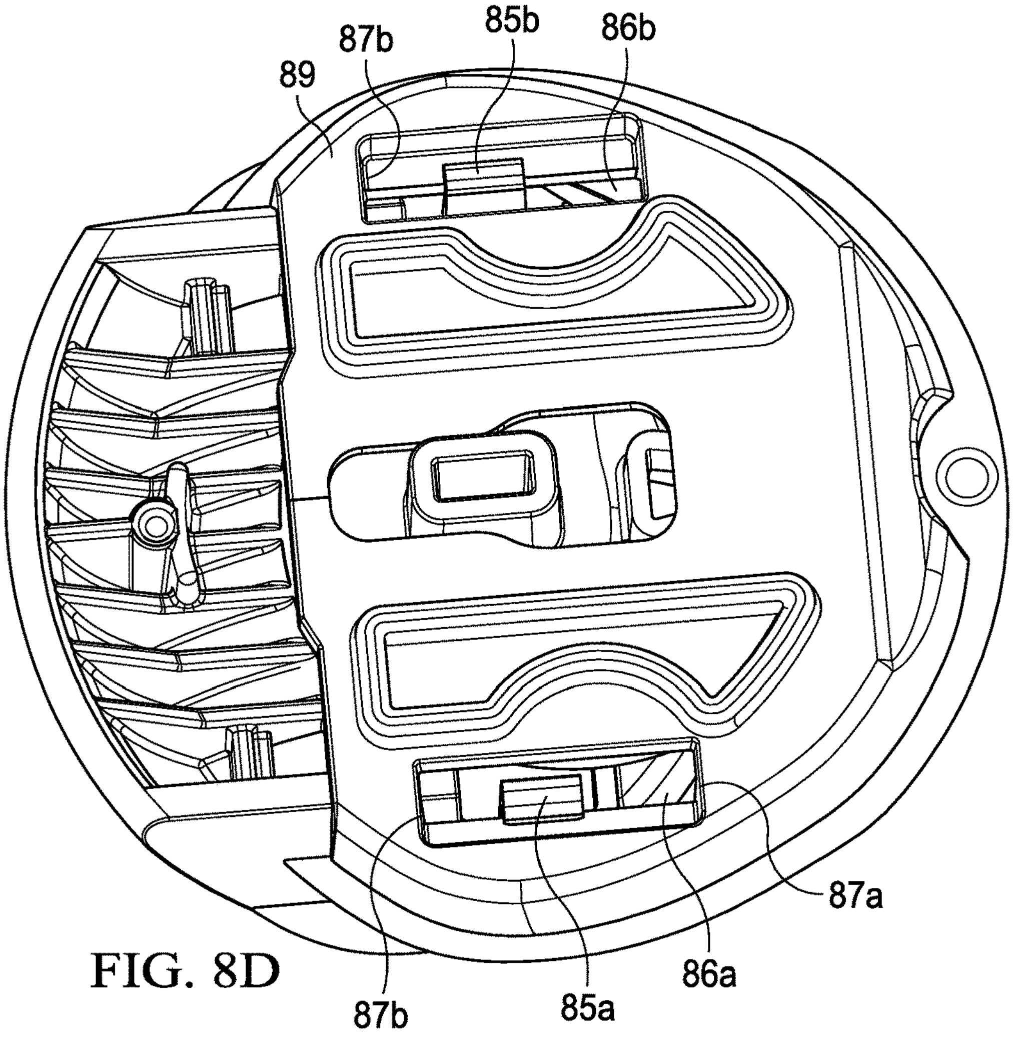
Figure 8E:
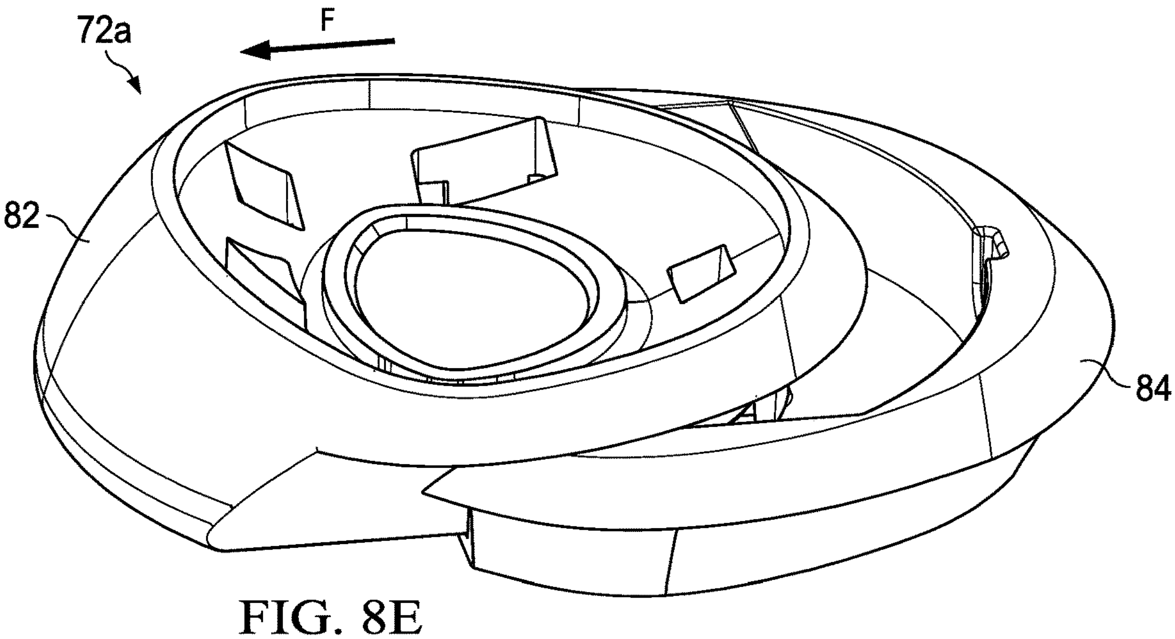
Figure 8F:
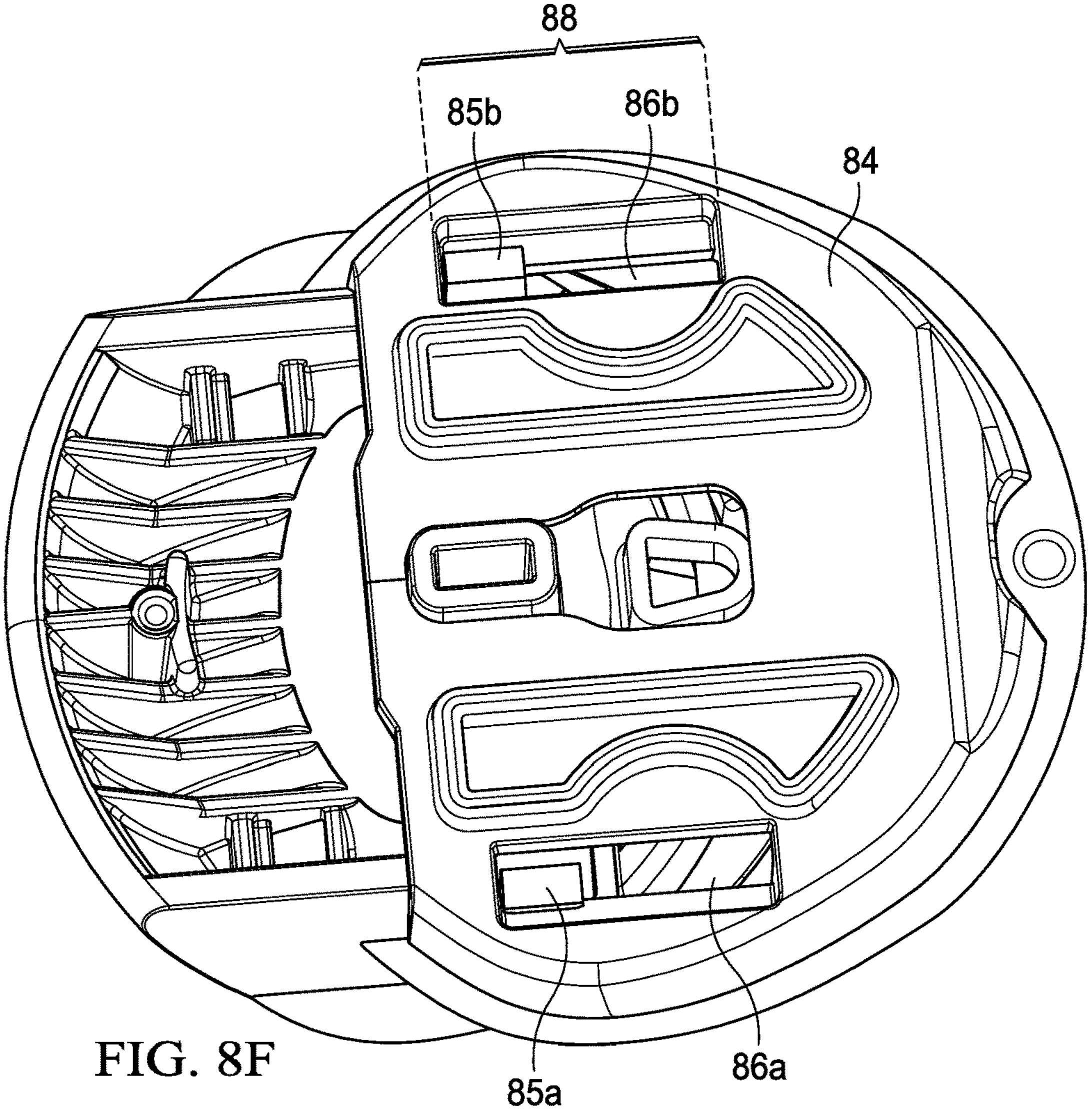
Figure 13A:
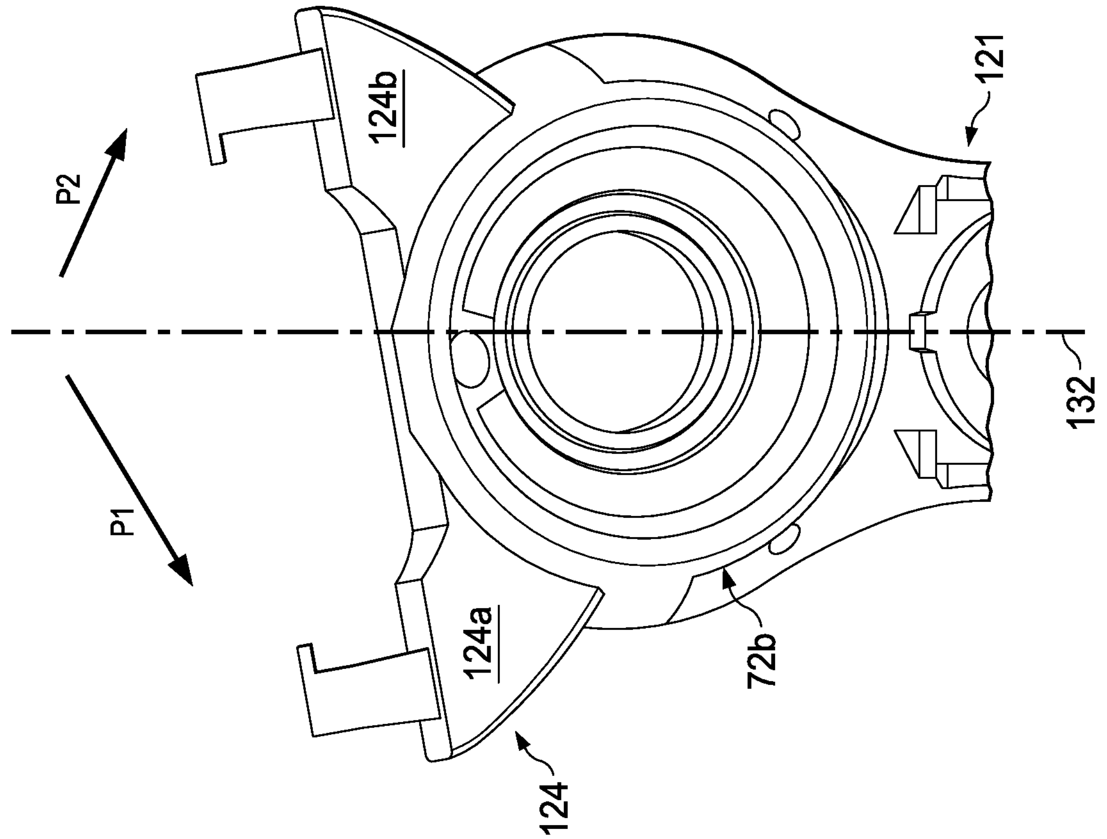
FIG. 13A-13C depicts schematic views of a second movable member assembly having a pivot functionality with a spring member in a pivot movement in accordance with the present invention.
Figure 13B:
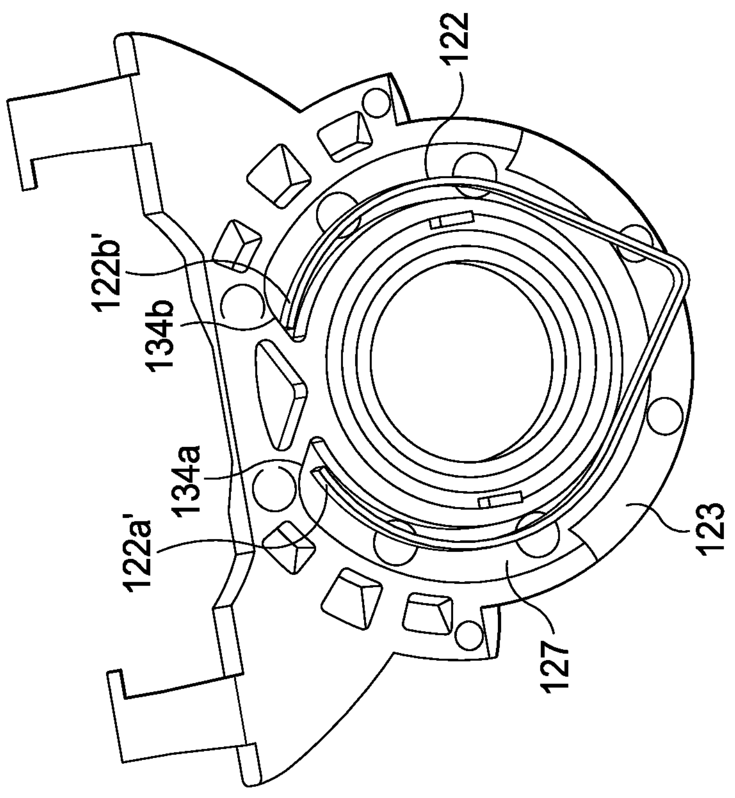
Figure 13C:
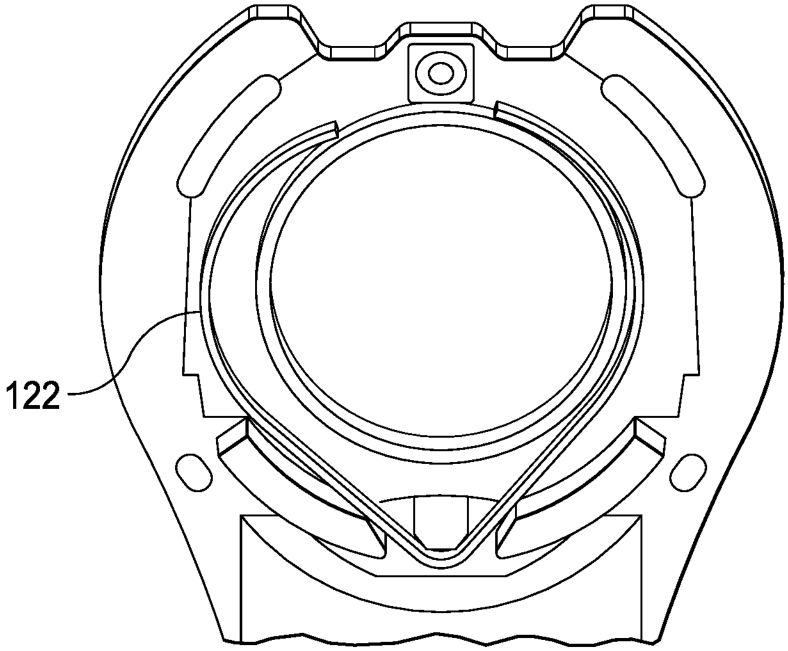

FIG. 13 schematically depicts the movement of the pivot member 124 of the razor cartridge relative to the handle 73. As shown in view (A) of FIG. 13, the razor can pivot from centerline 132 in one or more directions (e.g., side to side) about pivot angle P1 and/or P2. In a non-limiting embodiment of the present invention, P1 can be about 12.5 degrees and P2 can be about 12.5 degrees. Thus, the pivot member 124 can provide a combined range of rotational motion of about 25 degrees. Arms 124*a* and 124*b* of the pivot member are directly or indirectly connected to a razor cartridge 71 (e.g., FIGS. 7A-7C). Thus, when the pivot member 124 moves, the cartridge can move accordingly. Spring member 122 will be disposed and move relatively freely within a track 127 on the underside surface 123 of the pivot member 124 as shown in FIG. 12 view (B) and FIG. 13 view (B). Distal ends 122*a*' and 122*b*' are not permanently mounted to the frame 121 or the pivot member 124. As shown in FIG. 13 in view (B) a pivot in one direction (e.g., to the left) is shown. In this pivot movement, the distal end 122*a*' of the spring member 122 moves away from contacting one of the stop walls 134*a* of the track 127. Though not shown, when the razor pivot member moves about angle P2, distal end 122*b*' of the spring member 122 moves away from contacting the opposite stop wall 134*b* of the track 127. FIG. 13 view (C) depicts the inner surface 128 of the frame 121 during a pivot movement. In one embodiment, spring member 122 deforms slightly more on one side than on the other during the pivot or rotational movement about angle P1 (shown in view (A) and (B)). As noted above, the first and second movable member assemblies 72*a* and 72*b* of the present invention may be joined together to form an integral unit as shown in FIGS. 7A and 7B. The assemblies can be joined together through the handle frame 121.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A razor comprising a loop shaped spring member, the loop shaped spring member disposed in an assembly with a movable member, the assembly with the movable member comprising of an ejection button designed to travel forward towards a cartridge a distance from about 2.5 mm to about 10 mm, wherein said loop shaped spring member comprises a flat wire, wherein said loop shaped spring member comprises a diameter that extends in a plane parallel to a longitudinal axis of said assembly with said movable member, wherein said loop shaped spring member is fully encompassed within said assembly with said movable member, wherein said loop shaped spring member is disposed within a track, wherein the track is a circular shape, wherein said loop shaped spring member comprises two end portions, each of said end portions having a respective free distal end, wherein said distal ends are not joined together, and wherein said end portions of said loop shaped spring member overlap forming an overlapping portion.

2. The razor of claim 1, wherein said assembly with said movable member moves a razor cartridge in one or more directions relative to a handle of said razor.

3. The razor of claim 1, wherein said assembly with said movable member is a portion of a handle of said razor, a portion of a razor cartridge or both.

4. The razor of claim 1, wherein one or both of said distal ends are curved.

5. The razor of claim 4, wherein said curved distal ends curve toward a center of said loop shaped spring member.

6. The razor of claim 1, wherein said distal ends are not fixed to any structure in said assembly with said movable member.

7. The razor of claim 1, wherein said two distal ends are spaced apart.

8. The razor of claim 1, wherein said loop shaped spring member comprises one or more retarding structures, said one or more retarding structures comprising a knob, protrusion, recess, notch, divot, or point of any size and structure having a curved or linear profile or any combination thereof.

9. The razor of claim 8, wherein said one or more retarding structures comprises a knob, and wherein said knob comprises a curved profile.

10. The razor of claim 8, wherein said one or more retarding structures on said loop shaped spring member is or are disposed generally opposite an overlapping portion formed by an overlap of end portions of said loop shaped spring member.

11. The razor of claim 8, wherein said one or more retarding structures extend into a center of said loop spring member, extends out from a circumference of said loop spring member, or a combination thereof.

12. The razor of claim 1, wherein said loop shaped spring member is a closed loop.

13. The razor of claim 1, wherein said loop shaped spring member comprises an oval, circle, elliptical, ring shape, modified V-shape, tear drop shape, or any combination thereof.

14. The razor of claim 1, wherein said loop shaped spring member has an overall length of 30 mm to 90 mm when straightened.

15. The razor of claim 1, wherein said loop shaped spring member has radii of curvature between 1 mm to 12 mm.

16. A razor comprising a loop shaped spring member, the loop shaped spring member disposed in an assembly with a movable member, the assembly with the movable member comprising of an ejection button designed to travel forward towards a cartridge a distance from about 2.5 mm to about 10 mm, wherein an overall length of the loop shaped spring member is formed into a loop shape that extends in a single plane, wherein said single plane is parallel to a longitudinal axis of said assembly with said movable member, wherein said loop shaped spring member comprises a diameter that extends in said single plane, wherein said loop shaped spring member is fully encompassed within said assembly with said movable member, wherein said loop shaped spring member is disposed within a track, wherein the track is a circular shape, wherein said loop shaped spring member comprises two end portions, each of said end portions having a respective free distal end, wherein said distal ends are not joined together, and wherein said end portions of said loop shaped spring member overlap forming an overlapping portion.

* * * * *